US011082191B2

(12) United States Patent
Kazmi et al.

(10) Patent No.: US 11,082,191 B2
(45) Date of Patent: Aug. 3, 2021

(54) SERVING CELL INTERRUPTION IN MULTICARRIER WITH SHORTENED TTI PATTERNS

(71) Applicant: Telefonaktiebolaget LM Ericsson (publ), Stockholm (SE)

(72) Inventors: Muhammad Kazmi, Sundbyberg (SE); Joakim Axmon, Limhamn (SE); Christopher Callender, Kinross (GB); Imadur Rahman, Sollentuna (SE)

(73) Assignee: Telefonaktiebolaget LM Ericsson (Publ)

( * ) Notice: Subject to any disclaimer, the term of this patent is extended or adjusted under 35 U.S.C. 154(b) by 28 days.

(21) Appl. No.: 16/348,081

(22) PCT Filed: Nov. 17, 2017

(86) PCT No.: PCT/SE2017/051143
§ 371 (c)(1),
(2) Date: May 7, 2019

(87) PCT Pub. No.: WO2018/093327
PCT Pub. Date: May 24, 2018

(65) Prior Publication Data
US 2019/0305912 A1    Oct. 3, 2019

Related U.S. Application Data

(60) Provisional application No. 62/423,483, filed on Nov. 17, 2016.

(51) Int. Cl.
*H04L 5/00*    (2006.01)
*H04W 16/14*    (2009.01)
(Continued)

(52) U.S. Cl.
CPC .............. *H04L 5/0082* (2013.01); *H04L 1/00* (2013.01); *H04L 5/0055* (2013.01);
(Continued)

(58) Field of Classification Search
None
See application file for complete search history.

(56) References Cited

U.S. PATENT DOCUMENTS

2015/0036658 A1*  2/2015  Mochizuki ............ H04W 16/14
                                                    370/331
2016/0309466 A1* 10/2016  Chen ................. H04W 72/1278

FOREIGN PATENT DOCUMENTS

WO       2016167921 A1   10/2016

OTHER PUBLICATIONS

International Search Report and Written Opinion date Feb. 8, 2018 for International Application No. PCT/SE2017/051143 filed on Nov. 17, 2017, consisting of 9-pages.
(Continued)

*Primary Examiner* — Yaotang Wang
(74) *Attorney, Agent, or Firm* — Christopher & Weisberg, P.A.

(57) ABSTRACT

A method, wireless device and network node for supporting at least one transmission time interval, TTI, are disclosed. According to one aspect, a method includes communicating with a network node in a first cell on a first carrier. The method further includes determining an operation to be performed by the wireless device in a second cell on a second carrier. The method further includes performing the determined operation in the second cell while interrupting the communication with the network node in the first cell on the first carrier according to an interruption parameter that does not exceed an interruption threshold that depends on a duration of a TTI on the first carrier.

14 Claims, 12 Drawing Sheets

(51) Int. Cl.
*H04W 72/04* (2009.01)
*H04L 1/00* (2006.01)
*H04L 27/00* (2006.01)

(52) U.S. Cl.
CPC .......... *H04L 5/0098* (2013.01); *H04W 16/14* (2013.01); *H04W 72/0453* (2013.01); *H04L 5/001* (2013.01); *H04L 27/0006* (2013.01)

(56) References Cited

OTHER PUBLICATIONS

3GPP TR 36.881 V14.0.0; 3rd Generation Partnership Project; Technical Specification Group Radio Access Network; Evolved Universal Terrestrial Radio Access (E-UTRA); Study on latency reduction techniques for LTE (Release 14); Jun. 2016, consisting of 99-pages.

* cited by examiner

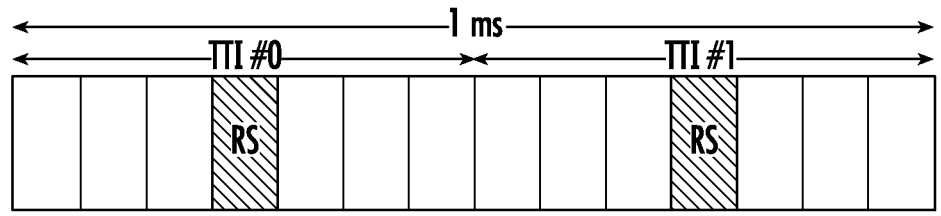
FIG. 3
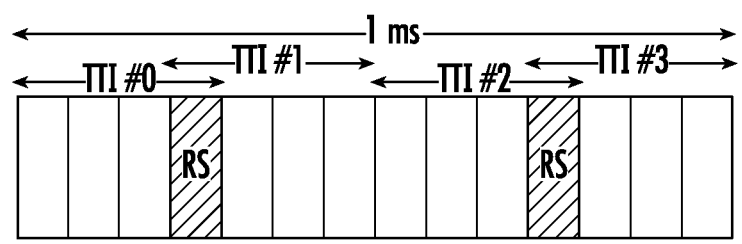
FIG. 4
FIG. 5

SERVING CELL INTERRUPTION IN MULTICARRIER WITH SHORTENED TTI PATTERNS

CROSS-REFERENCE TO RELATED APPLICATIONS

This application is a Submission Under 35 U.S.C. § 371 for U.S. National Stage Patent Application of International Application No.: PCT/SE2017/051143, filed Nov. 17, 2017 entitled "SERVING CELL INTERRUPTION IN MULTI-CARRIER WITH SHORTENED TRANSMISSION TIME INTERVAL PATTERNS," which claims priority to U.S. Provisional Application No. 62/423,483, filed Nov. 17, 2016, entitled "SERVING CELL INTERRUPTION IN MULTICARRIER WITH SHORTENED TTI PATTERNS," the entireties of all of which are incorporated herein by reference.

FIELD

The disclosure is directed toward wireless communications, and in particular, serving cell interruption in multi-carrier wireless networks with shortened transmission time interval (TTI) patterns.

BACKGROUND

Long term evolution (LTE) uses orthogonal frequency division multiplexing (OFDM) in the downlink and discrete Fourier transform (DFT)-spread OFDM in the uplink. In the time domain, LTE downlink transmissions are organized into radio frames of 10 ms, each radio frame consisting of ten equally-sized subframes of length $T_{subframe}=1$ ms. A radio frame is shown in FIG. 1.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. This is also denoted as TTI (Transmission Time Index).

Downlink transmissions are dynamically scheduled. In each subframe the base station transmits control information concerning to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical HARQ indication channels (PHICH) carrying acknowledgment/non-acknowledgment (ACK/NACK) for the uplink transmission.

The downlink subframe also contains common reference symbols (CRS), which are known to the receiver and used for coherent demodulation of, e.g., the control information. A downlink system with CFI=3 OFDM symbols as control is illustrated in FIG. 2. In a Rel-8 transmission time interval (TTI), one such portion of the downlink (DL) transmission is referred to as one TTI.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or single carrier frequency division multiple access (SC-FDMA) symbols in the case of normal cyclic prefix and 12 OFDM or SC-FDMA symbols in the case of extended cyclic prefix. In LTE release 13, a study item began in 2015, with the goal of specifying transmissions with shorter TTIs that are much shorter than the LTE release 8 TTI. The shorter TTIs can be decided to have any duration in time and comprise resources on a number of OFDM or SC-FDMA symbols within a 1 ms subframe (SF). As one example, the duration of the short TTI may be 0.5 ms, i.e., seven OFDM or SC-FDMA symbols for the case with normal cyclic prefix. As another example, the duration of the short TTI may be 2 symbols.

As seen in FIG. 2, the TTI length consists of 14 OFDM symbols. In cases of a shortened TTI, the TTI length can be reduced to 2-OFDM symbols, 4-OFDM symbols or 7-OFDM symbols. These are denoted as: 2-OS sTTI, 4-OS sTTI, 7-OS sTTI, respectively. An OFDM symbol herein can also be an SC-FDMA symbol or any type of symbol.

The shortened TTI can be used in different values in different directions, such as downlink (DL) and uplink (UL). For example: a DL can use 2-OS sTTI, while an UL can use 4-OS sTTI in the same cell.

For different frame structures, such as FS1, FS2 and FS3, the sTTI that is used could be different too. The time domain structure in FIG. 1 relates to FS1. However, 2-OS, 4OS and 7 OS TTI are also usable for FS1. For FS2, which is used for TDD, 7-OS sTTI is one of the shortened TTI modes. Some example TTI durations are given below.

For 7-symbol TTI, the sTTI structure shown in FIG. 3 is supported for UL according to agreements in R1-1611055. If 4-symbol UL sTTI is supported, the sTTI structure shown in FIG. 4 is adopted according to agreements in R1-1611055. As shown in FIG. 5, the 2-OS sTTI can have one of two options. From the point of view of the UL sTTI, the following is observed:

There are three different TTI lengths that are possible for UL. Out of these, there are different patterns possible for 2OS TTI;
  Dynamic indication of TTI length in fast UL grant can be done;
  Dynamic indication of the demodulation reference symbol (DMRS) position in fast UL grant can also be done; and
  For some of the TTI patterns, a DMRS shared between wireless devices is possible. For some wireless devices, this also means that they will need to send DMRS for two TTIs when the wireless device is scheduled across neighboring TTIs.

Radio measurements are done by the wireless device on the serving as well as on neighbor cells over some known reference symbols or pilot sequences. The measurements are done on cells on an intra-frequency carrier, inter-frequency carrier(s) as well as on inter-radio access technology (radio access (RAT) carriers(s) (depending upon the wireless device capability whether it supports that RAT).

In multi-carrier or carrier aggregation (CA) scenarios, the wireless device may perform the measurements on the cells on the primary component carrier (PCC) as well as on the cells on one or more secondary component carriers (SCCs). A CA capable wireless device may also perform inter-frequency measurements without measurement gaps since the wireless device has a broadband receiver and/or multiple receivers.

The wireless device may perform measurements on cells on frequencies belonging to a non-serving carrier (i.e. inter-frequency and/or inter-RAT measurements) or SCC with or without measurement gaps (aka compressed mode gaps in wideband code division multiple access (WCDMA)/high speed packet access (HSPA)) depending upon its capability. When performing measurements on cells belonging to non-serving carrier(s) or SCC without measurement gaps, the wireless device may have to retune its receiver bandwidth, e.g., changing the center frequency of its oscillator. This in turn may also cause interruption of signals on the serving cell of the wireless device.

Examples of intra-frequency and inter-frequency measurements in LTE are reference symbol received power (RSRP) and reference symbol received quality (RSRQ). Examples of intra-frequency and inter-frequency measurements in HSPA are common pilot channel received signal code power (CPICH RSCP) and CPICH carrier energy over noise spectral density (Ec/No).

When the serving cell is HSPA, the inter-RAT measurements may include inter-radio access technology (RAT) LTE, inter-RAT global system for mobile communications (GSM), inter-RAT code division multiple access (CDMA2000), inter-RAT wireless local area network (LAN), etc. Examples of GSM measurements are GSM Carrier received signal strength indicator (RSSI). When the serving cell is LTE frequency division duplex (FDD) the inter-RAT measurements may comprise of inter-RAT LTE time division duplex (TDD), inter-RAT LTE HSPA, inter-RAT GSM, inter-RAT CDMA2000, inter-RAT wireless LAN etc. When the serving cell is LTE TDD the inter-RAT measurements may include inter-RAT LTE TDD, inter-RAT LTE HSPA, inter-RAT GSM, inter-RAT CDMA2000, inter-RAT wireless LAN, etc.

The mobility measurement may also include identifying or detecting a cell, which may belong to LTE, HSPA, CDMA2000, GSM, etc. The cell detection includes identifying at least the physical cell identity (PCI), primary scrambling code (PSC) or base station identity code (B SIC) and subsequently performing the signal measurement (e.g., RSRP, RSCP or RSSI) of the identified cell. The wireless device may also have to acquire the cell global ID (CGI) of a cell. In HSPA and LTE, the serving cell can request the wireless device to acquire the system information (SI) of the target cell. More specifically the SI is read by the wireless device to acquire the cell global identifier (CGI), which uniquely identifies a cell, of the target cell. The wireless device may also be requested to acquire other information such as a closed subscriber group (CSG) indicator, CSG proximity detection, etc., from the target cell.

Examples of positioning measurements in LTE include reference signal time difference (RSTD) for observed time difference of arrival (OTDOA) positioning method and wireless device receive-transmit (RX-TX) time difference measurement for an enhanced cell identification (E-CID) positioning method. The wireless device RX-TX time difference measurement requires the wireless device to perform measurement on a downlink reference signal as well as on uplink transmitted signals.

The radio measurements performed by the wireless device are used by the wireless device for one or more radio operational tasks. Examples of such tasks are reporting the measurements to the network, which in turn may use the measurements for various tasks. For example, in radio resource control (RRC) connected state, the wireless device reports radio measurements to the serving node. In response to the reported wireless device measurements, the serving network node takes certain decisions, e.g., it may send a mobility command to the wireless device for the purpose of cell change. Examples of cell change are handover, RRC connection re-establishment, RRC connection release with redirection, PCell change in CA, primary component carrier (PCC) change in PCC etc. In idle or low activity state example of cell change is cell reselection. In another example, the wireless device may itself use the radio measurements for performing tasks, e.g., cell selection, cell reselection, etc.

A multi-carrier serving cell setup herein refers to a procedure which enables the network node to at least temporarily setup or release a secondary serving cell at the wireless device for multi-carrier operation, e.g., the use of an SCell in a CA capable wireless device, primary SCell (PScell) in dual connectivity (DC), etc. Herein, the serving setup or release procedure or command can perform any one or more of:

Configuration of SCell(s), aka SCell addition,
De-configuration of SCell(s), also known as SCell release,
Activation of SCell(s),
Deactivation of SCell(s),
Setting up or addition of PSCell in dual connectivity,
Release of PSCell in dual connectivity.

A SCell setup or release (i.e., when SCell is configured, de-configured, activated or deactivated) may cause a glitch or interruption of operation on the PCell or any other activated SCell. The operation herein means reception and/or transmission on signals. The glitch in UL and/or DL typically occurs when the wireless device has a single radio chain to receive and/or transmit more than one CC. However, the glitch may even occur when the wireless device has independent radio chains on the same chip. The glitch mainly occurs when the carrier aggregation (CA) capable wireless device changes its reception and/or transmission bandwidth (BW) from single-carrier to multiple-carrier operation or vice versa. In order to change the BW, the wireless device has to reconfigure its RF components in the RF chain, e.g., RF filter, power amplifier (PA), local oscillator, etc. The interruption can vary between 2-5 milliseconds (ms). The interruption is caused due to several factors including RF tuning to reconfigure BW (i.e. shorten or extend), setting or adjusting of radio parameters such as automatic gain control (AGC) setting, etc.

SUMMARY

Embodiments include several methods in both the wireless device and the network node, as well as arrangements of the wireless device and the network node.

Some embodiments include a method in a wireless device for a wireless communication system supporting at least one transmission time interval (TTI) The method includes communicating with a network node in a first cell on a first carrier. The method further includes determining an operation to be performed by the wireless device in a second cell on a second carrier. The method also includes performing the determined operation in the second cell while interrupting the communication with the network node in the first cell on the first carrier according to a value of an interruption parameter that does not exceed an interruption threshold that depends on a duration of a TTI on the first carrier.

According to another aspect, in some embodiments, a wireless device for a wireless communication system supporting at least one TTI is provided. The wireless device includes processing circuitry configured to communicate with a network node in a first cell on a first carrier. The processing circuitry is further configured to determine an operation to be performed by the wireless device in a second cell on a second carrier. The processing circuitry is further configured to perform the determined operation in the second cell. The processing circuitry is further configured to interrupt the communicating with the network node in the first cell on the first carrier according to a value of an interruption parameter that does not exceed an interruption threshold that depends on a duration of a TTI on the first carrier.

According to yet another aspect, a wireless device for a wireless communication system supporting at least one TTIs is provided. The wireless device includes a transceiver module configured to communicate with a network node in a first cell on a first carrier. The wireless device includes an operation determination module configured to determine an operation to be performed by the wireless device in a second cell on a second carrier. The wireless device further includes a processing module configured to perform the determined operation in the second cell. The wireless device also includes an interrupt module configured to interrupt the communicating with the network node in the first cell on the first carrier according to a value of an interruption parameter that does not exceed an interruption threshold that depends on a duration of a TTI on the first carrier.

According to one aspect, a method in a network node for a wireless communication system supporting at least one TTI is provided. The method includes communicating with a wireless device in a first cell on a first carrier. The method also includes configuring the wireless device to perform an operation in a second cell on a second carrier. The method also includes determining a value of an interruption parameter according to which communication with the wireless device in the first cell on the first carrier is to be interrupted, the value of the interruption parameter not exceeding an interruption threshold that is based on a duration of a TTI on the first carrier. The method further includes interrupting communication with the wireless device in the first cell on the first carrier according to the value of the interruption parameter while the wireless device performs the operation.

According to yet another aspect, a network node for a wireless communication system supporting at least one TTI is provided. The network node includes a transceiver configured to communicate with a wireless device in a first cell on a first carrier. The network node also includes processing circuitry configured to configure the wireless device to perform an operation in a second cell on a second carrier. The processing circuitry is further configured to determine a value of an interruption parameter according to which communication with the wireless device in the first cell on the first carrier is to be interrupted, the value of the interruption parameter not exceeding an interruption threshold that is based on a duration of a TTI on the first carrier, and interrupt communication with the wireless device in the first cell on the first carrier according to the value of the interruption parameter while the wireless device performs the operation.

According to this aspect, in some embodiments, the operation includes at least one of schedule adaptation, configuration change, TTI change, carrier frequency change and bandwidth change. In some embodiments, the duration of the TTI on the first carrier of the first cell is one of 7 symbols, 4 symbols and 2 symbols. In some embodiments, the interruption threshold depends on a frequency separation between the first carrier and the second carrier. In some embodiments, a magnitude of the interruption threshold interruption is inversely proportional to a magnitude of the frequency separation. In some embodiments, the interruption threshold depends on whether the first carrier is in a licensed band and the second carrier is in an unlicensed band. In some embodiments, the wireless device determines a duration of a TTI on a carrier of the first cell via one of information received from the network node, a predefined rule and autonomous determination. In some embodiments, the processing circuitry is further configured to use results of the interruption for performing at least one of schedule adaptation, configuration change, TTI change, measurements, carrier frequency change and bandwidth change.

According to another aspect, a network node for a wireless communication system supporting at least one TTI is provided. The network node includes a transceiver module configured to communicate with a wireless device in a first cell on a first carrier. The network node also includes a configuration module configured to configure the wireless device to perform an operation in a second cell on a second carrier. The network node also includes an interruption determination module configured to determine a value of an interruption parameter according to which communication with the wireless device in the first cell on the first carrier is to be interrupted, the value of the interruption parameter not exceeding an interruption threshold that is based on a duration of a TTI on the first carrier. The network node further includes an interrupt module configured to interrupt communication with the wireless device in the first cell on the first carrier according to the value of the interruption parameter while the wireless device performs the operation. Some embodiments advantageously provide a method, wireless device and network node for supporting operation when a transmission time interval, TTI, changes over time. According to one aspect, a method includes obtaining a request to perform an operation in a second cell at a second carrier frequency when a serving cell operates in a first cell at a first carrier frequency using a first bandwidth. The method includes configuring the wireless device to operate on a second bandwidth which corresponds to a bandwidth of the second cell. The method further includes performing the requested operation in the second cell. The method also includes interrupting, while performing the operation in the second cell, signals between the wireless device and the first cell.

According to this aspect, in some embodiments, the wireless device is not allowed to cause interruption of signals by more than a maximum allowed interruption of signals. In some embodiments, the maximum allowed interruption of signals depends at least on a duration of a TTI. In some embodiments, the maximum allowed interruption of signals depends on a relationship between the first and second carrier frequencies. In some embodiments, the method further includes using results of the operation in the second cell for performing one or more operational tasks.

According to another aspect, a wireless device for supporting operation when a transmission time interval, TTI, changes over time is provided. The wireless device includes a receiver configured to receive a request to perform an operation in a second cell at a second carrier frequency when the serving cell operates in a first cell at a first carrier frequency using a first bandwidth. The wireless device also includes processing circuitry including a memory and a processor. The memory is configured to store the request. The processor is configured to cause the receiver to operate on a second bandwidth which corresponds to a bandwidth of the second cell, perform the requested operation in the second cell, and interrupt, while performing the operation in the second cell, signals between the wireless device and the first cell.

According to this aspect, in some embodiments, the wireless device is not allowed to cause interruption of signals by more than a maximum allowed interruption of signals. In some embodiments, the maximum allowed interruption of signals depends at least on a duration of a TTI. In some embodiments, the maximum allowed interruption of signals depends on a relationship between the first and second carrier frequencies. In some embodiments, the wireless device further includes using results of the operation in the second cell for performing one or more operational tasks.

According to another aspect, a method in a network node for supporting operation when a transmission time interval, TTI, changes over time is provided. The method includes configuring a wireless device to perform an operation in a second cell at a second carrier frequency when the serving cell operates in a first cell at a first carrier frequency using a first bandwidth. The method also includes determining a maximum interruption level which the wireless device should not exceed when operating signals between the wireless device and the first cell while performing the operation in the second cell. The method further includes using the determined interruption level for performing at least one operational task.

According to this aspect, in some embodiments, a maximum allowed interruption of signals depends at least on a duration of a TTI. In some embodiments, the maximum allowed interruption of signals depends on a relationship between the first and second carrier frequencies. In some embodiments, the at least one operational task includes at least one of adapting scheduling of data to the wireless device, adapting a measurement configuration and transmitting the adapted measurement configuration to the wireless device, reconfiguring cell parameters, changing the TTI used in the first cell.

According to yet another aspect, a network node for supporting operation when a transmission time interval, TTI, changes over time is provided. The network node includes a transmitter configured to send a command to a wireless device, the command configuring the wireless device to perform an operation in a second cell at a second carrier frequency when the serving cell operates in a first cell at a first carrier frequency using a first bandwidth. The network also includes processing circuitry including a memory and a processor. The memory is configured to store the command. The processor is configured to determine a maximum interruption level which the wireless device should not exceed when operating signals between the wireless device and the first cell while performing the operation in the second cell. The processor is also configured to use the determined interruption level for performing at least one operational task.

According to this aspect, in some embodiments, a maximum allowed interruption of signals depends at least on a duration of a TTI. In some embodiments, the maximum allowed interruption of signals depends on a relationship between the first and second carrier frequencies. In some embodiments, the at least one operational task includes at least one of adapting scheduling of data to the wireless device, adapting a measurement configuration and transmitting the adapted measurement configuration to the wireless device, reconfiguring cell parameters, changing the TTI used in the first cell.

According to yet another aspect, a wireless device for supporting operation when a transmission time interval, TTI, changes over time is provided. The wireless device includes a receiver module configured to receive a request to perform an operation in a second cell at a second carrier frequency when the serving cell operates in a first cell at a first carrier frequency using a first bandwidth. The wireless device also includes a memory module configured to store the request. A bandwidth controller module is configured to cause the receiver to operate on a second bandwidth which corresponds to a bandwidth of the second cell. An operation module is configured to perform the requested operation in the second cell. An interrupt module is configured to interrupt, while performing the operation in the second cell, signals between the wireless device and the first cell.

According to another aspect, a network node for supporting operation when a transmission time interval, TTI, changes over time is provided. The network node includes a transmitter module configured to send a command to a wireless device, the command configuring the wireless device to perform an operation in a second cell at a second carrier frequency when the serving cell operates in a first cell at a first carrier frequency using a first bandwidth. The network node includes a memory module configured to store the command. An interruption determiner module is configured to determine a maximum interruption level which the wireless device should not exceed when operating signals between the wireless device and the first cell while performing the operation in the second cell. An operational task module is configured to use the determined interruption level for performing at least one operational task.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is an example of a 7 symbol TTI;
FIG. 4 is an example of a 4 symbol TTI;
FIG. 5 is a diagram of a proposed configuration of TTIs.

DETAILED DESCRIPTION

In a known solution, an interruption on PCell of up to 5 subframes is allowed for intra-band CA when any of the SCell setup or release procedures are executed by the wireless device. However, an interruption on the PCell of up to 1 subframe is allowed for inter-band CA when any of the SCell setup or release procedures are executed by the wireless device. When multiple SCCs are configured then this requirement extends to the PCell and any activated SCell.

During the interruption period the wireless device cannot receive from and/or transmit any signal or information to the network. During the interruption the wireless device cannot perform measurements due to its inability to receive and/or transmit signals. This leads to the loss or dropping of packets transmitted between the wireless device and its serving cell(s). It should be noted that the interruption may impact several or all active carriers, and may affect both the uplink and downlink.

Figure 1:
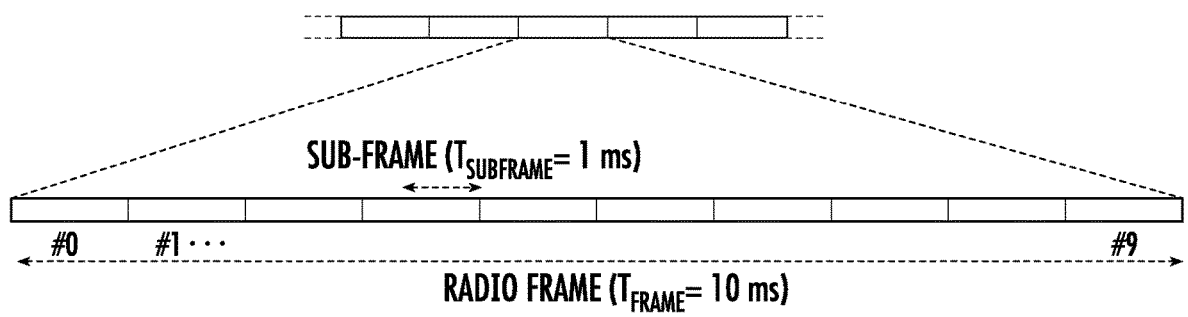
FIG. 1 illustrates a radio frame with 10 subframes.
Figure 2:
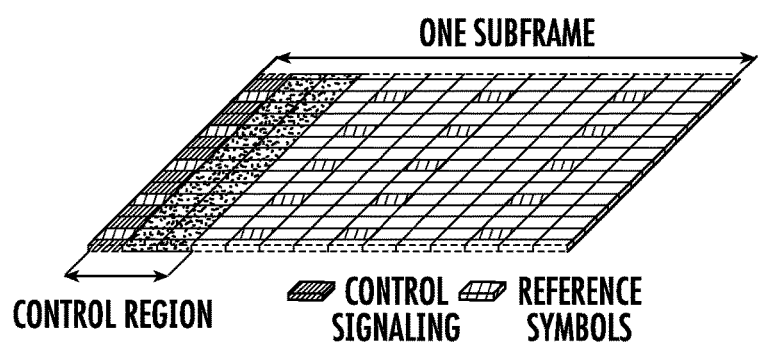
FIG. 2 illustrates a downlink subframe.
Figure 6:
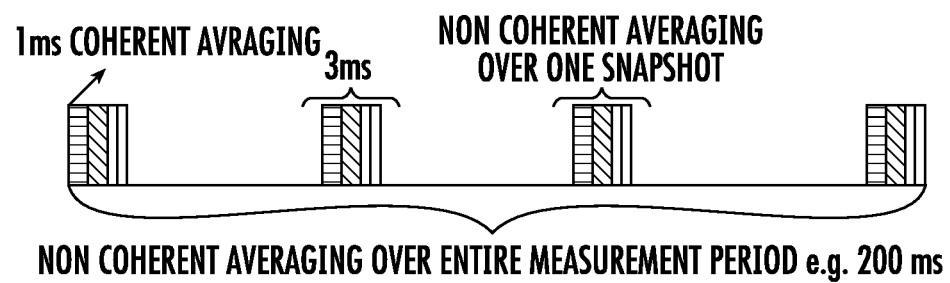
FIG. 6 is an example of RDRP measurement averaging.

The overall serving cell or neighbor cell measurement performed by the wireless device includes non-coherent averaging of 2 or more basic non-coherent averaged samples over a measurement period. The exact sampling depends upon the implementation and is generally not specified. An example of RSRP measurement averaging in evolved universal terrestrial radio access network (E-UTRAN) is shown in FIG. 6. FIG. 6 illustrates that the wireless device obtains the overall measurement quantity result by collecting four non-coherent averaged samples or snapshots (each of 3 ms length in this example) during the physical layer measurement period (i.e., 200 ms) when no discontinuous reception (DRX) is used or when DRX cycle is not larger than 40 ms. The same measurement principle applies to UTRAN measurements e.g. CPICH RSCP.

Figure 7:
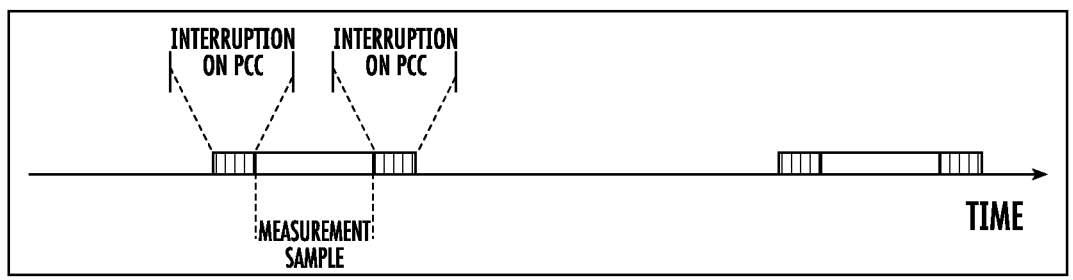
FIG. 7 is an example of interruption on a PCC due to measurements on an SCC with deactivated SCell.

When performing measurement on cells on non-serving carriers or SCCs with deactivated SCell(s) without gaps, the wireless device typically retunes or reconfigures its receiver. Therefore, the interruption in DL and/or UL of a serving cell occurs before and after each measurement sample, i.e., when the bandwidth is extended (e.g. from 20 MHz to 40 MHz) and also when it is reverted back to the BW of the serving carriers (e.g. from 40 MHz to 20 MHz). The interruption may also occur when serving carrier and non-serving carrier or SCC are on the same chip. The interruption in each direction in this case can be between 2-5 ms since the wireless device has to retune the center frequency and the bandwidth of the downlink. The occurrence of interruption due to measurement sampling is illustrated in FIG. 7. The wireless device does measurements on cells of SCC with deactivated SCell(s) and non-serving carriers on a regular basis which is configurable by the eNB (base station). Therefore, the data loss on PCell and activated SCell(s) will also occur whenever the cells of SCC with deactivated SCell(s) or non-serving carriers are measured.

In the current specifications, the wireless device supports only one TTI (i.e., 1 ms). The wireless device requirements for interruption of signals on a serving cell (e.g., PCell) when the wireless device performs an operation on another cell are defined based on only 1 ms of TTI. Therefore, the current wireless device implementation that would result in certain level of interruption is designed for 1 ms. This is not optimal for the wireless device which supports more than one TTI e.g. 2-OS (2 OFDM Symbol), 4-OS, 7-OS, 1 ms., etc. The wireless device supporting more than one TTI pattern may experience significant performance degradation if the existing requirements are applied for any TTI patterns supported by the wireless device. Thus, embodiments discussed below address these shortcomings when the wireless device supports multiple TTIs of different durations.

According to some embodiments, a wireless device capable of supporting multiple TTIs of different durations determines an operation to be performed by the wireless device in a second cell on a second carrier. The wireless device performs the determined operation in the second cell while interrupting the communication with a network node in a first cell on a first carrier according to an interruption parameter that does not exceed an interruption threshold that depends on a duration of a TTI on the first carrier.

Before describing in detail exemplary embodiments, it is noted that the embodiments reside primarily in combinations of apparatus components and processing steps related to serving cell interruption in multicarrier wireless networks with shortened transmission time interval (TTI) patterns. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Before describing the details of the disclosure, some generalizations are described. In some embodiment a term network node is used. An example of a network node could be a more general term and can correspond to any type of radio network node or any network node, which communicates with a wireless device and/or with another network node. Examples of network nodes are NodeB, base station (BS), multi-standard radio (MSR) radio node such as MSR BS, eNodeB, gNodeB, MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g., E-SMLC), MDT etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU), Remote Radio Head (RRH), etc.

Another example of a node could be user equipment, this is a non-limiting term user equipment (UE) and it refers to any type of wireless device communicating with a network node and/or with another wireless device in a cellular or mobile communication system. A non-limiting term wireless device is used herein and it refers to any type of wireless device communicating with a network node and/or with another wireless device in a cellular or mobile communication system. Examples of wireless devices are target device, device to device (D2D) wireless device, machine type wireless device or wireless device capable of machine to machine (M2M) communication, PDA, Tablet, mobile terminals, smart phone, laptop embedded equipped (LEE), laptop mounted equipment (LME), universal serial bus (USB) dongles, etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

A component carrier (CC) also interchangeably called as carrier, PCC or SCC is configured at the wireless device by the network node using higher layer signaling e.g. by sending RRC configuration message to the wireless device. The configured CC is used by the network node for serving the wireless device on the serving cell (e.g., on PCell, PSCell, SCell etc.) of the configured CC. The configured CC is also used by the wireless device for performing one or more radio measurements (e.g. RSRP, RSRQ etc.) on the cells operating on the CC e.g. PCell, SCell or PSCell and neighboring cells.

The term radio access technology, or RAT, may refer to any RAT, e.g., UTRA, E-UTRA, narrow band internet of things (NB-IoT), WiFi, Bluetooth, next generation RAT (new radio (NR)), 4G, 5G, etc. Any of the first and the second nodes may be capable of supporting a single or multiple RATs.

A wireless device may be configured to operate in a carrier aggregation (CA) mode implying aggregation of two or more carriers in at least one of DL and UL directions. With CA, a wireless device can have multiple serving cells, wherein the term 'serving' herein means that the wireless device is configured with the corresponding serving cell and may receive from and/or transmit data to the network node on the serving cell e.g. on PCell or any of the SCells. The data is transmitted or received via physical channels e.g. physical downlink shared channel (PDSCH) in DL, physical uplink shared channel (PUSCH) in UL etc. A component carrier (CC) also interchangeably called a carrier or aggregated carrier, PCC or SCC, is configured at the wireless device by the network node using higher layer signaling e.g. by sending an RRC configuration message to the wireless device. The configured CC is used by the network node for serving the wireless device on the serving cell (e.g. on PCell, PSCell, SCell, etc.) of the configured CC. The configured CC is also used by the wireless device for performing one or more radio measurements (e.g. RSRP, RSRQ etc.) on the cells operating on the CC e.g., PCell, SCell or PSCell and neighboring cells.

The term signal used herein can be any physical signal or physical channel. Examples of physical signals are reference signal such as primary synchronization signal (PSS), secondary synchronization signal (SSS), cell specific reference signal (CRS), positioning reference signal (PRS), etc. The term physical channel (e.g., in the context of channel reception) used herein is also called as 'channel. Examples of physical channels are management information base (MIB), physical broadcast channel (PBCH), narrow band physical broadcast channel (NPBCH), physical downlink control channel (PDCCH), PDSCH, such, short DSCH (sPDSCH), short physical uplink control channel (sPUCCH), short PUSCH (sPUSCH), machine type PDCCH (MPDCCH), narrow band PDCCH (NPDCCH), narrow band (NPDSCH), enhanced PDCCH (E-PDCCH), PUSCH, physical uplink control channel (PUCCH), narrow band PUSCH (NPUSCH), etc.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period over which a physical channel can be encoded and interleaved for transmission. The physical channel is decoded by the receiver over the same time period over which it was encoded. The TTI may also be interchangeably called short TTI (sTTI), transmission time, interleaving time, slot, sub-slot, mini-slot, short subframe (SSF), mini-subframe, etc.

The term reconfiguration of bandwidth (BW) used herein may correspond to changing the bandwidth of a carrier frequency. The BW reconfiguration requires the wireless device to change center frequency of the carrier, also known as the frequency of the local oscillator. Over the BW the network node transmits to and/or receives signal from one or more wireless devices in a cell. The BW may interchangeably be called radio frequency (RF) BW, carrier BW, carrier frequency BW, operating BW, channel bandwidth, system bandwidth, transmission bandwidth, cell bandwidth, cell transmission BW, etc. The BW may be expressed in different units. Examples of units are kilo Hertz (kHz), mega Hertz (MHz), number of resource blocks, number of resource elements, number of subcarriers, number of physical channels, number of frequency resource units etc. The frequency channel or carrier frequency over which a RAT operates is enumerated or addressed by a channel number, also known as absolute radio frequency channel number (ARFCN), e.g., E-UTRA ARFCN (EARFCN) in LTE, etc.

The term TTI used herein may correspond to any time period (T0) over which a physical channel can be encoded and optionally interleaved for transmission. The physical channel is decoded by the receiver over the same time period (T0) over which it was encoded. The TTI may also interchangeably be called short TTI (sTTI), transmission time, slot, sub-slot, mini-slot, short subframe (SSF), mini-subframe, etc.

The term radio measurement used herein may comprise any measurement based on receiving a radio signal or channel, e.g., power-based measurements such as received signal strength (e.g., RSRP or channel state information (CSI)-RSRP) or quality measurements (e.g., RSRQ, RS-SINR, signal to interference plus noise ratio (SINR), Es/Iot, signal to noise ratio (SNR)); cell identification; synchronization signals measurements; angle measurements such as angle of arrival (AOA); timing measurements such as Rx-Tx, return trip time (RTT), RSTD, TOA, TDOA, timing advance; throughput measurements; channel quality measurements such CSI, channel quality indication (CQI), PMI, channel measurement (e.g., MIB, SIBs, SI, cell global identity (CGI) acquisitions, etc.). A measurement may be absolute, relative to a common reference or to another measurement, composite measurement, etc. A measurement may be on one link or more than one links (e.g., RSTD, timing advance, RTT, relative RSRP; measurements over multifarious links described in). Measurements may also be differentiated by purpose and may be performed for one or more purposes, e.g., for one or more of: radio resource management (RRM), minimization of driving test (MDT), self-organizing network (SON), positioning, timing control or timing advance, synchronization. In a non-limited example, the disclosure may apply to any measurement such as described above.

The term "requirements" used herein may comprise any type of wireless device requirements related to wireless device measurements aka measurement requirements, RRM requirements, mobility requirements, positioning measurement requirements etc. Examples of wireless device requirements related to wireless device measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, CGI acquisition delay, etc.

The term interruption used herein may correspond to any type of interruption of signals between the wireless device and the serving cell (e.g. PCell, SCells or PSCell). The interruption leads to loss or degradation of serving cell performance. The interruptions may affect the performance of any one or more serving cells e.g. PCell, PSCell, SCell, etc. The loss in serving cell performance or the interruption can be expressed in terms of one or more metrics, which may be absolute or relative, such as error rate or loss of packets or packet loss rate or number of packets lost or packet drop rate or a reduction in the detection probability or an increase of misdetection probability or even probability of missed or dropped or lost packets. In particular, an interruption can be expressed in terms of one or more time resources which are interrupted, e.g., interruption time of 1 subframe, 5 subframes, 1 TTI, 2 TTI, etc. The term "packet" used herein refers to any 'block of data' such as transport block sent over radio interface in UL or DL. The packet loss rate or number of lost packets is typically estimated over a certain period of time, e.g., measurement time of a radio measurement, predefined time, etc. In one example, the interruption may be expressed as a value such as a total number of missed acknowledgement/non-acknowledgement (ACK/NACK) signals in response to continuous transmission of data to the wireless device from its serving cell over a certain time period. For example, the number of packets lost in LTE with 1 ms TTI will be 10 if the wireless device is unable to transmit 10 ACK/NACK in UL in response to continuous DL transmission over a period of 100 ms. In this example may also be the corresponding packet loss rate is 10% or 0.1. This may also be stated as the probability with which the fraction of ACK/NACK transmitted in the uplink in response to continuous DL transmission over a period are missed or dropped or lost. The packet loss rate may also be expressed as a ratio of any one or both of the following:

the number of missed ACK/NACK transmitted by the wireless device in response to continuous transmission of downlink data to the wireless device from its serving cell over certain a time period (T0)

the total number of ACK/NACK transmitted by the wireless device in response to continuous transmission of downlink data to the wireless device from its serving cell if all data blocks are received.

Therefore, the serving cell performance (e.g., PCell or SCell or PSCell performance) may be expressed in terms of the probability of missed ACK/NACK signals or in terms of total number of missed ACK/NACK signals in response to receiving DL data. For interruption on the PCell, performance can be referred to as 'PCell interruption in terms of number of missed ACK/NACK'. For interruption on any SCell, performance can be referred to as 'SCell interruption in terms of number of missed ACK/NACK'.

In one example, a wireless device (WD) is configured with one serving cell (e.g., PCell), also known as single carrier operation. In one embodiment, the wireless device is capable of supporting, i.e., configured to support, at least two different TTIs (e.g., TTI of 1 ms, TTI of 2-OS, etc.). The wireless device can be configured with any one of the plurality of TTIs supported by the wireless device in one time resource in the serving cell.

In another example, a wireless device is configured with at least two serving cells (e.g., PCell, SCells and PSCell, etc.), also known as carrier aggregation, multicarrier operation, dual connectivity, multi-connectivity, etc. The wireless device in this example is capable, i.e., configured to support, at least two different TTIs (e.g. TTI of 1 ms, TTI of 2-OS, etc.). The wireless device can be configured with any one of the plurality of TTIs supported by the wireless device in different serving cells, e.g., TTI=1 for operation on both PCell and SCell or TTI=2-OS for operation on both PCell and SCell. The wireless device can also be configured with different TTIs in different serving cells, e.g., TTI=1 and TTI=7-OS for operation on PCell and SCell respectively.

In the above example, it is assumed that the same TTI is used in each serving cell in the DL and in the UL, and also the same TTI is used in cell1 and another cell during the time when the wireless device performs an operation on another cell which requires RF BW configuration.

The wireless device may further be capable of supporting operation whereby the TTI is changed over time in one or more serving cells of the wireless device. The wireless device may further be capable of supporting operation using different TTI in uplink and downlink of any one of more of its serving cells.

Figure 8:
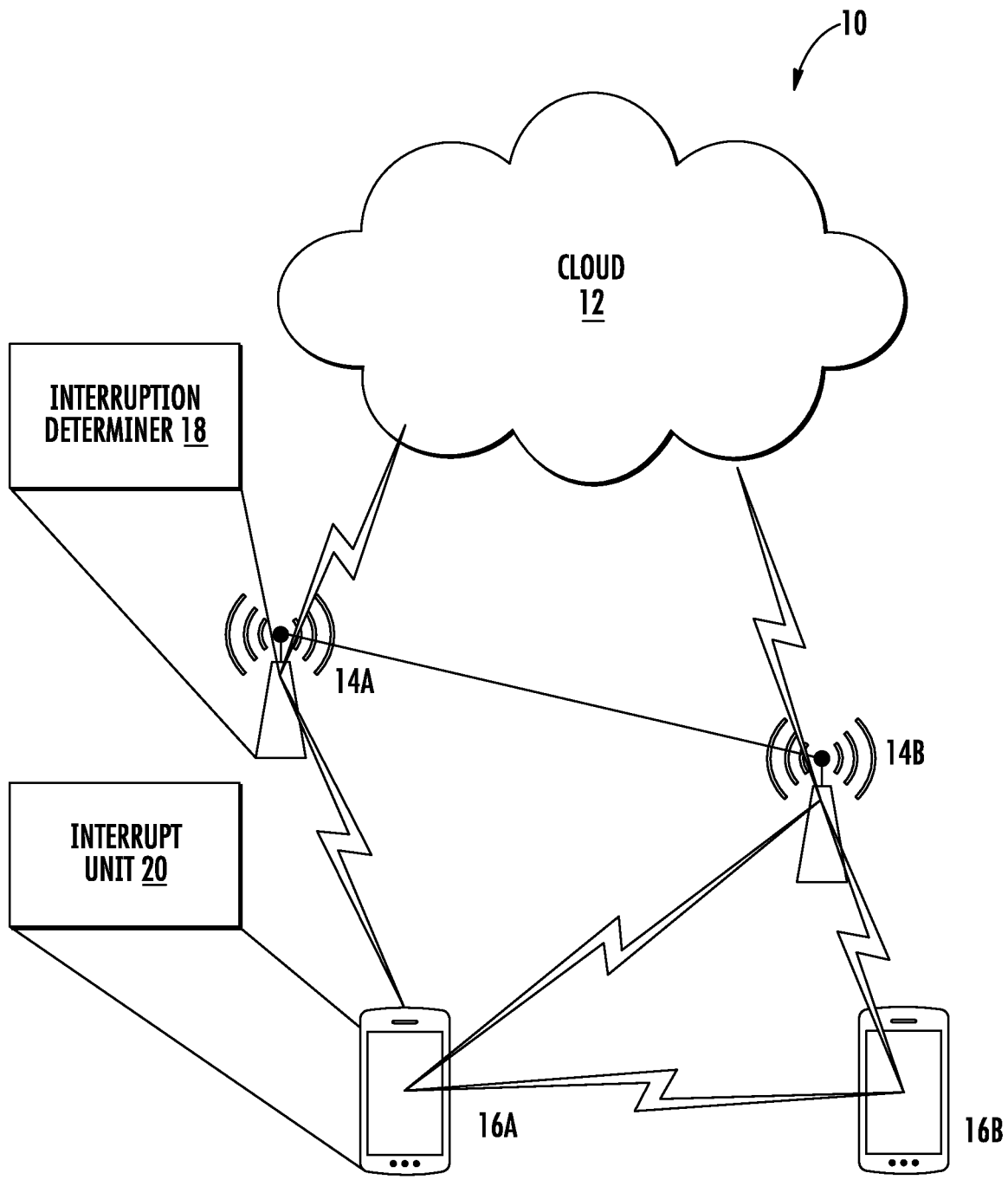
FIG. 8 is a block diagram of a wireless communication system constructed according to principles set forth herein.

Returning to the drawing figures, in which like elements are referred to by like reference numerals, there is shown in FIG. 8 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

As shown in FIG. 8 the network node 14 includes an interruption determiner 18 configured to determine a value of an interruption parameter according to which communication with the wireless device 16 in the first cell on the first carrier is to be interrupted, the value of the interruption parameter not exceeding an interruption threshold that is based on a duration of a TTI on the first carrier. The interruption parameter may be a time period over which the interruption occurs, a packet loss rate and a number of uplink feedback signals in response to receiving downlink data in the first cell. The wireless device 16 includes an interrupt unit 20 configured to interrupt the communicating with the network node 14 in the first cell on the first carrier according to a value of an interruption parameter that does not exceed an interruption threshold that depends on a duration of a TTI on the first carrier.

Figure 9:
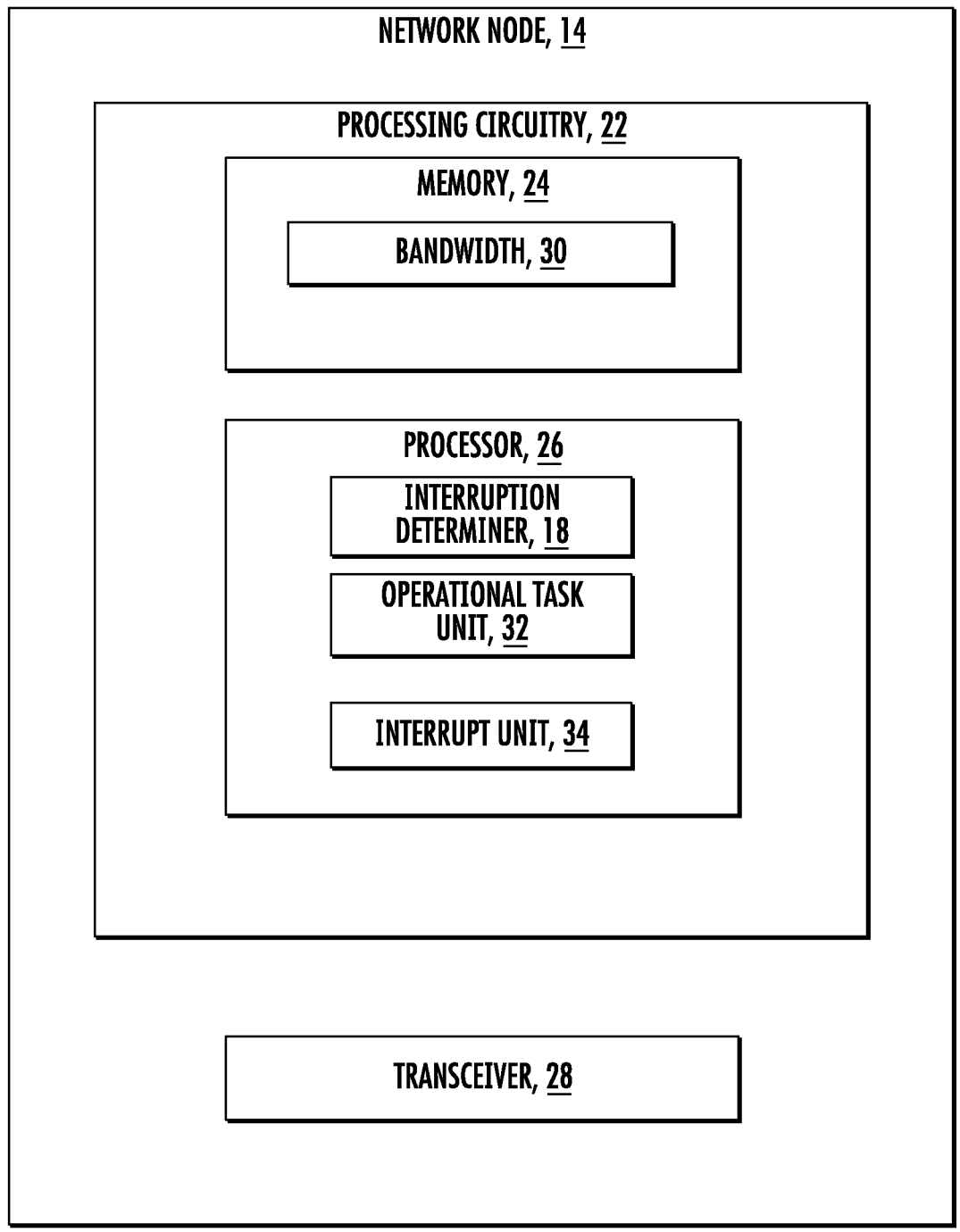
FIG. 9 is a block diagram of a wireless device for supporting operation when a transmission time interval, TTI, changes over time.

FIG. 9 is a block diagram of a network node 14. The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 22.

The memory 24 is configured to store a bandwidth of a first cell and a second cell. The bandwidth may be a bandwidth by which the first and/or second cell may be reconfigured. The processor 26 implements an interruption determiner 18 configured to determine a value of an interruption parameter according to which communication with the wireless device 16 in the first cell on the first carrier is to be interrupted, the value of an interruption parameter not exceeding an interruption threshold that is based on a duration of a TTI on the first carrier. The processor 26 also implements an operational task unit 32 configured to use the determined interruption parameter for performing at least one operational task. The processor 26 also implements an interrupt unit 34 configured to interrupt communication with the wireless device 16 in the first cell on the first carrier according to the value of the interruption parameter while the wireless device 16 performs the operation. The transceiver 28 is configured to send a command to a wireless device 16, the command configuring the wireless device 16 to perform an operation in a second cell at a second carrier frequency when the serving cell operates in a first cell at a first carrier frequency using a first bandwidth.

Figure 10:
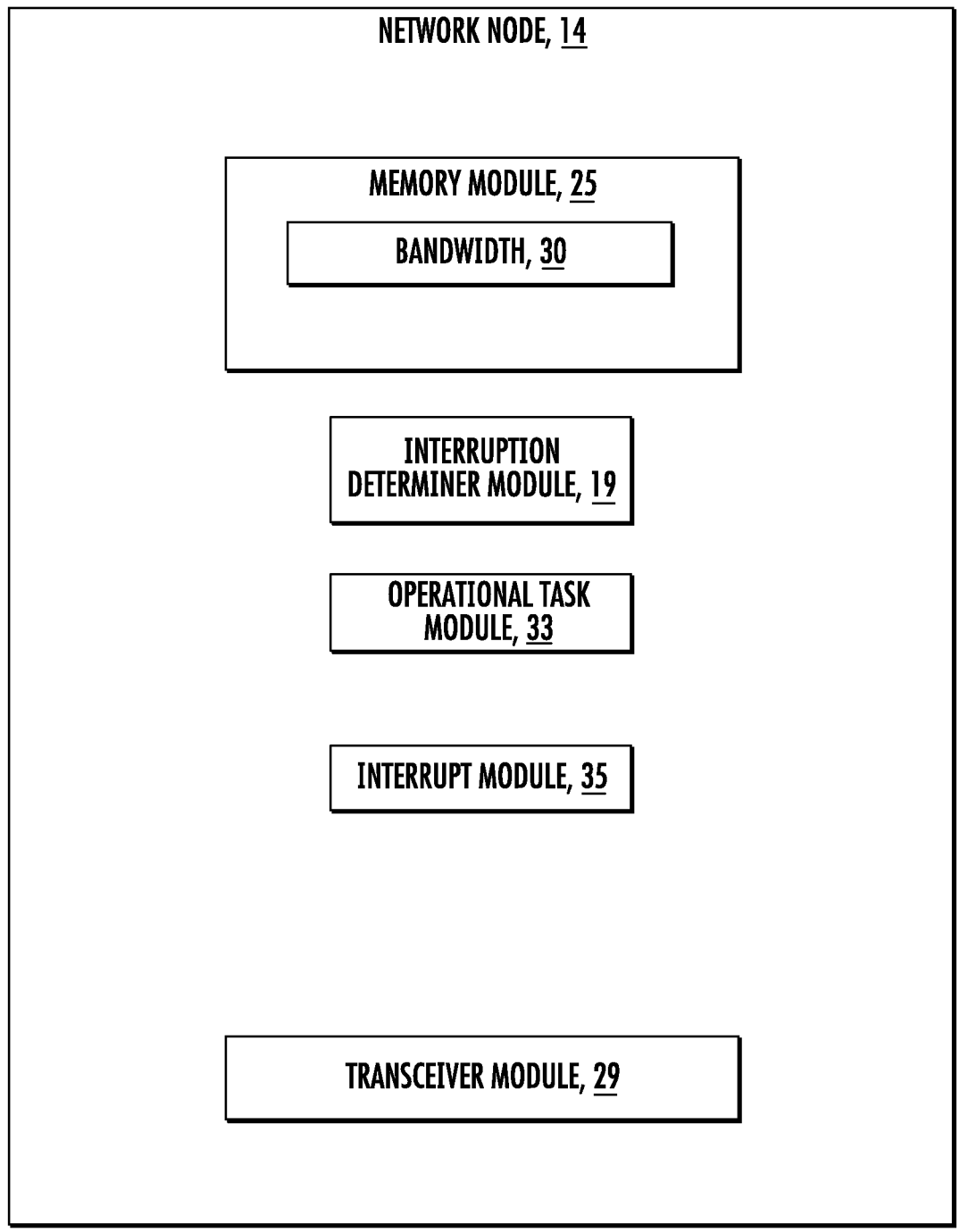
FIG. 10 is a block diagram of an alternative embodiment of the wireless device.

FIG. 10 is a block diagram of an alternative embodiment of the network node 14 that includes an interruption determiner module 19 configured to determine an interruption parameter according to which communication with the wireless device 16 in the first cell on the first carrier is to be interrupted, the interruption parameter not exceeding an interruption threshold that is based on a duration of a TTI on the first carrier. The network node 14 also includes an operational task module 23 configured to use the determined interruption parameter for performing at least one operational task. An interrupt module 35 configured to interrupt communication with the wireless device 16 in the first cell on the first carrier according to the interruption parameter while the wireless device 16 performs the operation. The transceiver module 29 is configured to send a command to a wireless device 16, the command configuring the wireless device 16 to perform an operation in a second cell at a second carrier frequency when the serving cell operates in a first cell at a first carrier frequency using a first bandwidth. Some of the modules in FIG. 10 may be implemented at least in part as software modules having software executable by a processor to perform the functions ascribed to the module.

Figure 11:
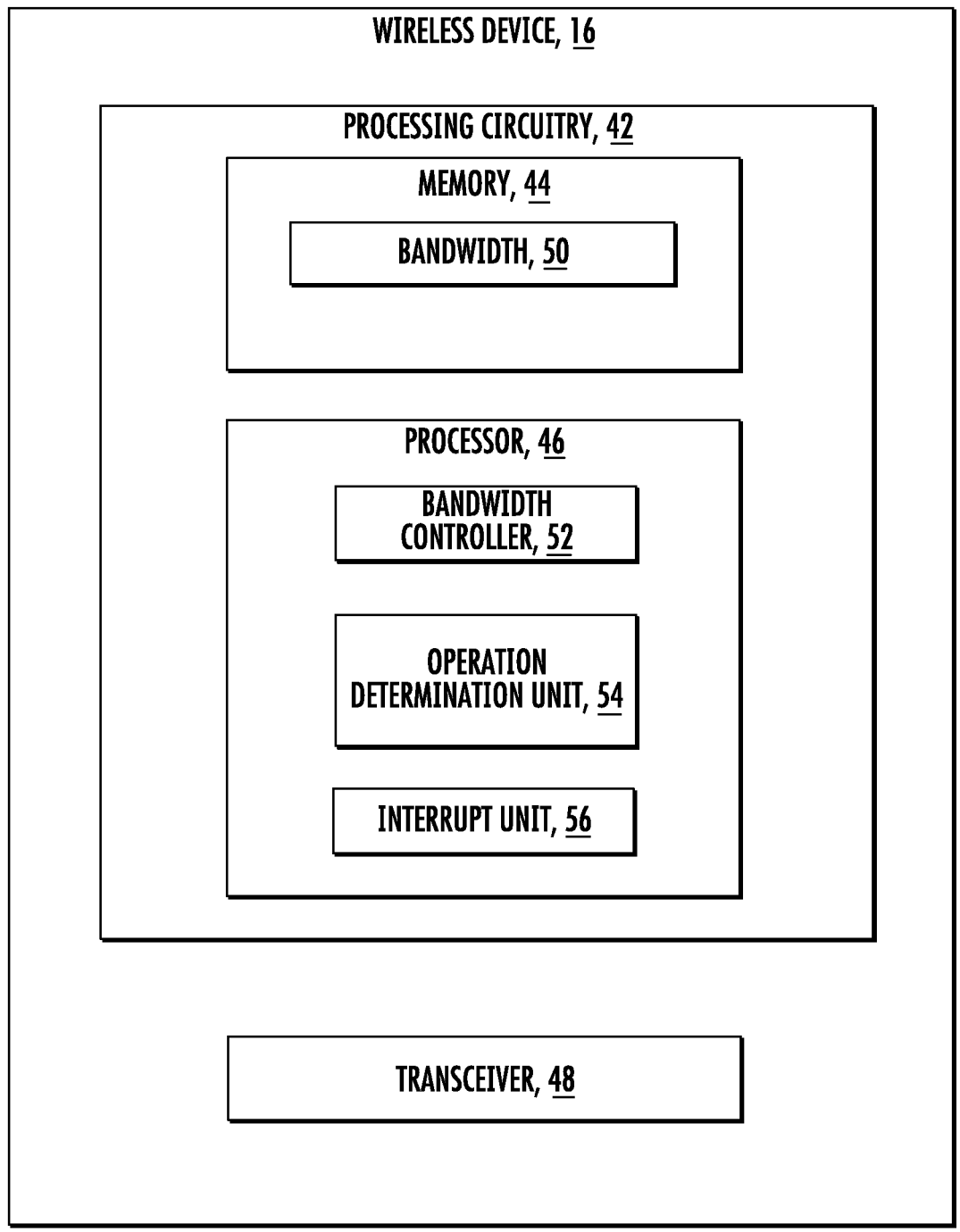
FIG. 11 is a block diagram of a network node.

FIG. 11 is a block diagram of a wireless device 16. In one embodiment, the wireless device 16 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store a bandwidth of at least one of the first cell and the second cell by which the wireless device 16 may be configured. The processor 46 includes a bandwidth controller 52 configured to cause a receiver of a transceiver 48 to operate on a second bandwidth which corresponds to a bandwidth of the second cell. The processor 26 also includes an operation determination unit 54 configured to determine an operation to be performed by the wireless device 16 in a second cell on a second carrier. The processor 46 is also configured to perform the determined operation in the second cell. An interrupt unit 56 is configured to interrupt the communicating with the network node 14 in the first cell on the first carrier according to an interruption parameter that does not exceed an interruption threshold that depends on a duration of a TTI on the first carrier. The transceiver 48 is configured to receive a request to perform an operation in a second cell at a second carrier frequency when the serving cell operates in a first cell at a first carrier frequency using a first bandwidth.

Figure 12:
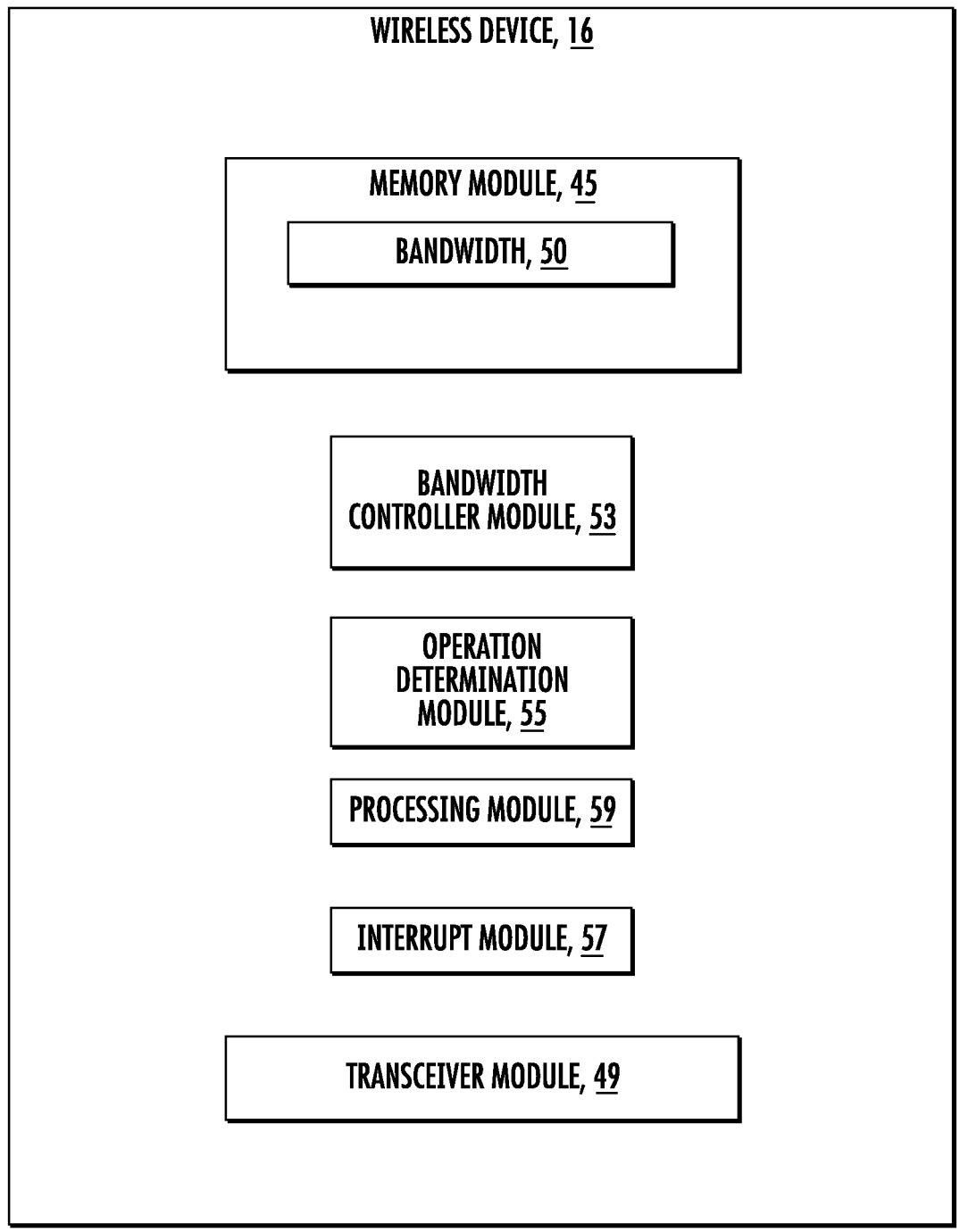
FIG. 12 is a block diagram of an alternative embodiment of the network node.

FIG. 12 is a block diagram of an alternative embodiment of the wireless device 16 that includes a bandwidth controller module 53 configured to cause the receiver to operate on a second bandwidth which corresponds to a bandwidth of the second cell. An operation determination module 55 is configured to determine an operation to be performed by the wireless device 16 in a second cell on a second carrier. A processing module 59 is configured to perform the determined operation in the second cell. An interrupt module 57 is configured to interrupt the communicating with the network node 14 in the first cell on the first carrier according to an interruption parameter that does not exceed an interruption threshold that depends on a duration of a TTI on the first carrier. The transceiver module 49 is configured to receive a request to perform an operation in a second cell at a second carrier frequency when the serving cell operates in a first cell at a first carrier frequency using a first bandwidth. Some of the modules in FIG. 12 may be implemented at least in part as software modules having software executable by a processor to perform the functions ascribed to the module.

Figure 13:
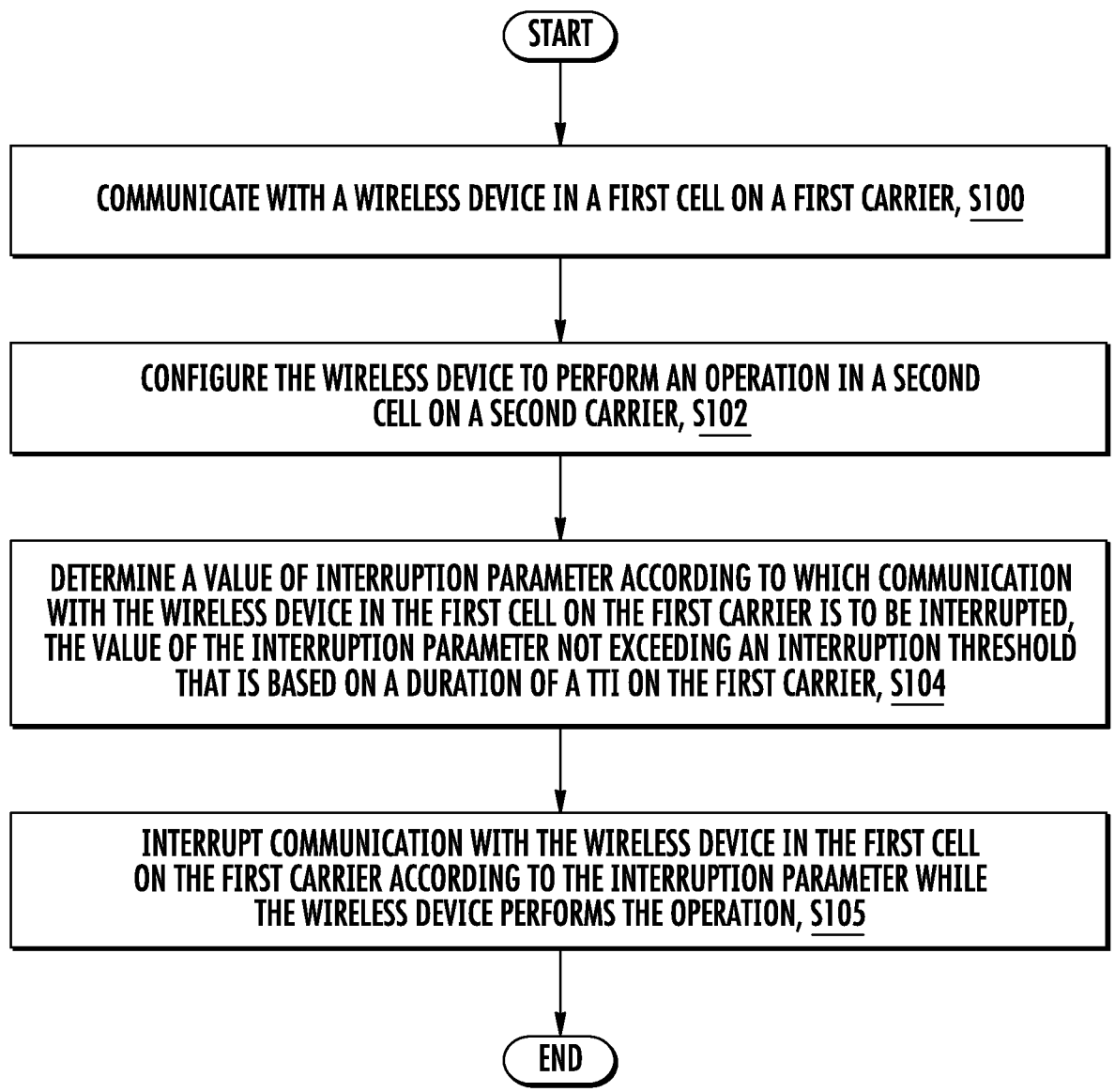
FIG. 13 is a flowchart of an exemplary process in a network node configured according to principles set forth herein.

FIG. 13 is a flowchart of an exemplary process in a network node 14. The process includes communicating, via a transceiver 28, with a wireless device 16 in a first cell on a first carrier (block S100). The process also includes configuring, via the operational task unit 32, the wireless device 16 to perform an operation in a second cell on a second carrier (block S102). The process further includes determining, via an interruption determiner 18, an interruption parameter according to which communication with the wireless device 16 in the first cell on the first carrier is to be interrupted, the interruption parameter not exceeding an interruption threshold that is based on a duration of a TTI on the first carrier (block S104). The process also includes interrupting, via the interrupt unit 34, communication with the wireless device 16 in the first cell on the first carrier according to the interruption parameter while the wireless device 16 performs the operation (block S105).

Figure 14:
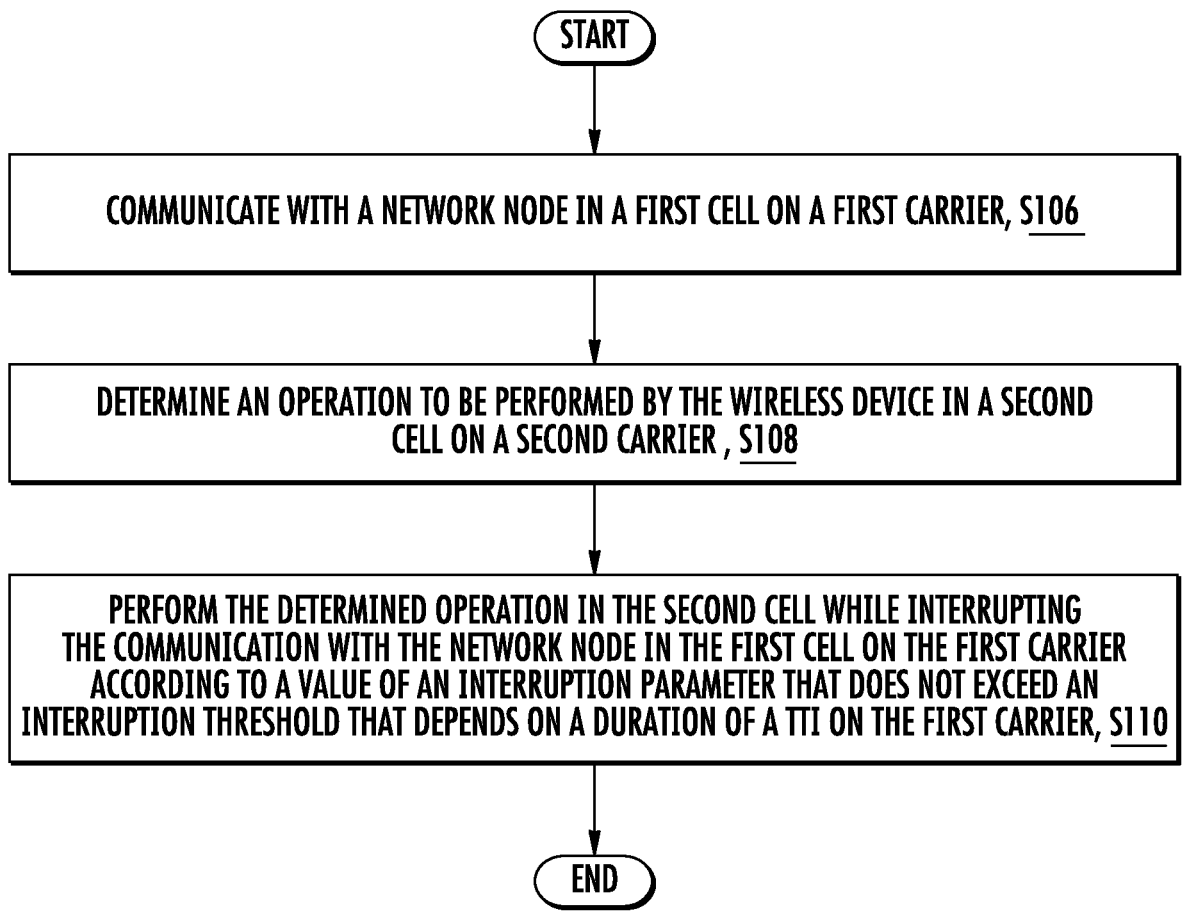
FIG. 14 is a flowchart of an exemplary process in a wireless device node configured according to principles set forth herein.

FIG. 14 is a flowchart of an exemplary process in a wireless device 16. The process includes communicating, via transceiver 48, with a network node 14 in a first cell on a first carrier (block S106). The process also includes determining, via the operation determination unit 54, an operation to be performed by the wireless device 16 in a second cell on a second carrier (block S108). The process further includes performing, via the processor 46, the determined operation in the second cell while interrupting, via the interrupt unit 56, the communication with the network node 14 in the first cell on the first carrier according to a value of an interruption parameter that does not exceed an interruption threshold that depends on a duration of a TTI on the first carrier (block S110).

Figure 15:
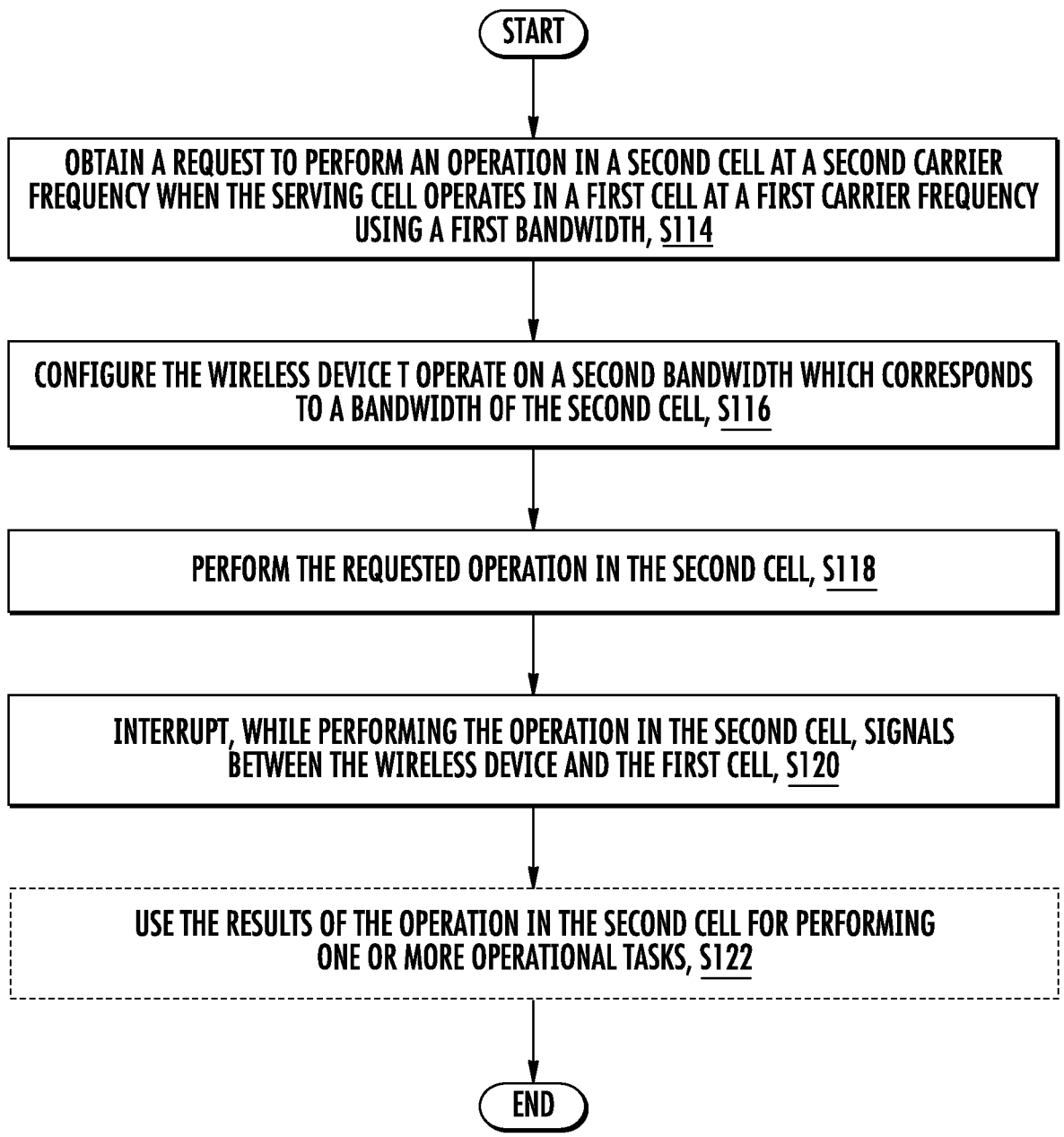
FIG. 15 is a flowchart of an exemplary process in a network node configured according to principles set forth herein.

Methods in a Wireless Device:

Several embodiments relate to methods in the wireless device 16 are described below. In some embodiments, the following steps may be performed, as shown by the flowchart of FIG. 15.

Step-1: Obtaining a request to perform an operation on a second cell (cell2) on a second carrier frequency (F2) when the serving cell operates in a first cell (cell1) on a first carrier frequency (F1) using a bandwidth of BW1 (block S114);

Step-2: Configuring or deconfiguring to operate on an additional bandwidth of at least BW2 which corresponds to the bandwidth of cell2 (block S116);

Step-3: Performing the operation on at least cell2 (block S118);

Step-4: Interrupting signals (S) operating between the wireless device 16 and a first cell (cell1) on a first carrier frequency (F1) while not exceeding a certain interruption threshold (Tr) which depends on at least a TTI used for operating S in cell1 (block S120); and Step-5 (optional): Using the results of the operation for performing one or more operational tasks or procedures e.g. transmitting the results to another node, cell change, etc. (block S122). Details regarding these steps are as follows:

Step-1

In this step, the wireless device 16 obtains a request to perform at least one operation on at least a second cell (cell2). The wireless device 16 may be requested to perform the operation on cell2, which may operate on the same carrier as that of the serving cell or on a carrier which is different than that of the serving cell. In one example, cell2 may operate on a second carrier (F2). In another example, cell2 may operate on a first carrier frequency (F1). Therefore, cell2 can be any of:
- intra-frequency cell,
- inter-frequency cell,
- cell of another RAT,
- a neighbor cell on the serving carrier, etc.

In another example, cell2 may also be a serving cell of the wireless device 16 e.g. PCell, SCell, PSCell, etc. Therefore, F2 can be a serving carrier or a non-serving carrier such as inter-frequency or inter-RAT carrier frequency (when the measurement request is on a second carrier).

The wireless device 16 may also be requested to perform a plurality of operations on cell2. The wireless device 16 may also be requested to perform one or a plurality of operations on plurality of cells e.g. cell2, cell21, cell22, etc.

One or more operations may require the wireless device 16 to reconfigure the BW of at least BW2, the bandwidth of cell2. Examples of such operations are radio measurements on cell2, measurements on deactivated cell2, measurements on cell2 if the BW of cell2 and the BW of the serving cell are different (i.e., BW1 and BW2 are different), configuration of cell2, reconfiguration of cell2, addition of cell2, release of cell2, activation of cell2, deactivation of cell2 etc. The wireless device 16 may obtain the request to perform or to initiate the operation on cell2 based on any one or more of the following mechanisms:
- Measurement configuration message received from another node (e.g., a network node 14 or another wireless device 16),
- A message or an indication, received from a higher layer in the wireless device 16 indicating the need to perform the operation on cell2,
- Event, condition, or a trigger based on which the wireless device 16 should perform the operation on cell2. For example, the wireless device 16 may perform the operation on cell2 if signal quality of one or more serving cells fall below their respective thresholds or below a common threshold.
- In another example, the wireless device 16 may perform the operation on cell2 if the wireless device 16 acquires the same physical cell ID (PCI) for two or more cells including cell2.
- A timer in the wireless device 16 indicating that the wireless device 16 should perform the operation on cell2.
- A new cell2 is being configured or activated thus wireless device 16 should perform the operation on cell2.
- The wireless device 16 battery power falls below a threshold or it rises above another threshold.
- The wireless device 16 loses the synchronization in any cell2 such that the wireless device 16 should perform the operation on cell2.
- Wireless device 16 implementation or wireless device 16 RF architecture requires the wireless device 16 to perform the operation on cell2.

One specific example of a received request can be a radio resource control (RRC) message containing a measurement configuration, e.g., for performing measurement on cells of the second carrier (F2). Another example is a receiving a medium access control (MAC) command. Yet another example is receiving a command in a layer 1 channel, e.g., PDCCH, E-PDCCH, etc.

Yet another example is receiving assistance data from a positioning node, e.g., LTE positioning protocol (LPP) message from an enhanced serving mobile location center (E-SMLC). In another example, the wireless device 16 may receive a request from the network node 14 to perform configuration or reconfiguration of cell2.

In yet another example, the wireless device 16 may receive a request from the network node 14 to perform addition or release of cell2.

In yet another example, the wireless device 16 may receive a request from the network node 14 to activate or deactivate cell2.

Step-2

In order to perform the operation on cell2, the wireless device 16 may be required to reconfigure bandwidth (BW) of at least BW2 in cell2. Therefore, in response to the obtained request, the wireless device 16 determines the type of operation in terms of whether the BW reconfiguration is needed or not. Whether the BW reconfiguration is needed or not depends on one or more of:
- BW of cell2 (BW2);
- BW of cell2 with respect to the serving cell;
- wireless device implementation or wireless device RF architecture (e.g., whether the wireless device 16 has one radio chain or separate radio chains);
- whether cell2 and the serving cell are in the same or different bands, etc.

The wireless device 16 therefore reconfigures the BW of at least BW2 if it is determined that the operation on cell2 requires the wireless device 16 to reconfigure its BW. The reconfiguration of the bandwidth can be any of:
- increasing or expanding the BW;
- decreasing the BW;
- changing center frequency of the BW;
- turning off a receiver and/or a transmitter;
- turning on a receiver and/or a transmitter, etc.

The bandwidth reconfiguration which may be necessary depends on the wireless device receiver architecture. For example, if intra-band DL carrier aggregation is implemented with a single receiver chain, the BW could be switched from 20 MHz (corresponding to single carrier operation with a 20 MHz carrier) to 40 MHz (corresponding to 2 adjacent carriers). In this case the center frequency of the receiver would be switched by 10 MHz. In another example, where the wireless device 16 performs interband DL carrier aggregation with multiple RF chains, the bandwidth reconfiguration would correspond to starting or stopping a receiver chain.

Step-3

In this step the wireless device 16 performs the operation on at least cell2 during a certain time period (T1). The time period for performing the operation (e.g., measurement period) may depend on the type of operation. The parameter T1 can be obtained based on any one or more of the following:
- pre-defined requirements, e.g.:
  - i) pre-defined measurement requirements;
  - ii) pre-defined activation or deactivation delay;
  - iii) etc.;
- configured by the network node 14;
- based on configured parameter, e.g., SCell measurement cycle;
- based on the history or statistics available to the wireless device 16, etc.

Step-4

In this step the wireless device 16, while performing the operation on cell2, may interrupt signals (S) operating between the wireless device 16 and a first cell (cell1) belonging to a first carrier frequency (F1). Cell1 is the serving cell of the wireless device 16, e.g., PCell, PSCell, SCell, etc.

The maximum allowed interruption, the interruption threshold, (Tr), of signals (S) depends on at least a TTI used by the wireless device 16 for operating S between the wireless device 16 and cell1. The wireless device 16 is not allowed to cause interruption of S by more than Tr when the wireless device 16 performs the operation on cell2. In order to ensure that the wireless device 16 does not exceed the maximum allowed interruption threshold (Tr), the wireless device 16 determines the value of Tr as function of the TTI used by the wireless device 16 in cell1. The wireless device 16 determines Tr based on a relation between Tr and TTI. The relation may be pre-defined or configured by the network node 14 (or any other node in the network), or based on some history or statistics available at the wireless device 16.

The wireless device 16 may further determine the value of Tr for a plurality of serving cells, but the basic principle is the same.

The value of Tr may further depend on whether cell1 and cell2 belong to the same carrier frequency (i.e., F1=F2) or different carrier frequencies (i.e., F1≠F2). In the first case (F1=F2), as an example, cell1 and cell2 with different bandwidths (BW) can operate on the same carrier e.g., cell1 BW1<cell2 BW2. For performing a measurement on cell2, the wireless device 16 may have to reconfigure the BW of the carrier of cell1 and cell2, e.g., F1. This will cause interruption on the serving cell on F1, e.g., cell1.

The value of the interruption threshold (Tr) may further depend on whether cell1 and cell2 belong to carrier frequencies in the same band (also known as intra-band carriers) or carriers in different bands (also known as inter-band carriers). For intra-band carriers the value of Tr may further depend on whether cell 1 and cell 2 belong to adjacent carrier frequencies (also known as contiguous carriers) or non-adjacent carrier frequencies (also known as non-contiguous carriers). In another example, the value of Tr may further depend on whether cell1 and cell2 belong to carrier frequencies in licensed band(s), or in licensed and unlicensed band(s). Here, an unlicensed band can also be a band where listen before talk (LBT) is required.

The relations between Tr and at least a first TTI (TTI1) used in cell1 may be expressed by several examples of expressions in (1)-(4):

$$Tr=f(TTI1) \quad (1)$$

$$Tr=f1(TTI1,F1,F2) \quad (2)$$

$$Tr=f2(TTI1,B1,B2) \quad (3)$$

$$Tr=f3(TTI1,B1,B2,\Delta) \quad (4)$$

where B1 and B2 are frequency bands of F1 and F2 respectively. Δ can be an additional interruption time due to having one or more cells in an unlicensed band (or in a license exempt band or in a band where LBT is required).

Specific examples of an interruption parameter are: time or duration (Dr) of each interruption, interruption probability of lost packets or data blocks in serving cell (i.e. cell1), a packet loss rate, interruption probability (Pr) in terms of minimum number (N) of missed UL feedback signals (e.g., ACK/NACK) in response to DL data allocation in serving cell (i.e., cell1).

The relation between an interruption threshold and at least TTI1 can also be determined based on a mapping table. One example of such a mapping table is shown in Table 1. In Table 1 it is assumed that F1 and F2 belong different frequency bands. Table 2 gives an example with specific figures used for Dr and Pr as function of TTI1 in cell1 when F1 and F2 are in different bands.

TABLE 1

An example of allowed interruption threshold in cell1 when wireless device 16 performs an operation on cell2 and when F1 and F2 belong to different frequency bands.

| | | Allowed interruption threshold of signals in cell1 when wireless device performs operation on cell2 | |
| --- | --- | --- | --- |
| Case | TTI used in cell1 | Duration of each interruption (Dr) in ms | Interruption probability (Pr) of signals (%) |
| 1 | 1 ms | D11 | P11 |
| 2 | 7-OS | D12 | P12 |
| 3 | 4-OS | D13 | P13 |
| 4 | 2-OS | D14 | P14 |

TABLE 2

An example of allowed interruption threshold in cell1 when wireless device 16 performs an operation on cell2 and when F1 and F2 belong to different frequency bands.

| | | Allowed interruption threshold of signals in cell1 when wireless device performs operation on cell2 | |
| --- | --- | --- | --- |
| Case | TTI used in cell1 | Duration of each interruption (Dr) in ms | Interruption probability (Pr) of signals (%) |
| 1 | 1 ms | 1 | 0.5 |
| 2 | 7-OS | 0.5 | 0.25 |
| 3 | 4-OS | 0.4 | 0.2 |
| 4 | 2-OS | 0.3 | 0.18 |

In the example in Table 3 below it is assumed that F1 and F2 belong to the same frequency band. Table 4 gives an example with specific figures used for Dr and Pr as function of TTI1 in cell1 when F1 and F2 are in the same bands.

TABLE 3

An example of allowed interruption threshold in cell1 when wireless device 16 does operation on cell2 and when F1 and F2 belong to the same frequency bands.

| | | Allowed interruption threshold of signals in cell1 when wireless device performs operation on cell2 | |
| --- | --- | --- | --- |
| Case | TTI used in cell1 | Duration of each interruption (Dr) in ms | Interruption probability (Pr) of signals (%) |
| 1 | 1 ms | D21 | P21 |
| 2 | 7-OS | D22 | P22 |
| 3 | 4-OS | D23 | P23 |
| 4 | 2-OS | D24 | P24 |

TABLE 4

An example of allowed interruption threshold in cell1 when wireless device 16 does operation on cell2 and when F1 and F2 belong to the same frequency bands.

| Case | TTI used in cell1 | Allowed interruption threshold of signals in cell1 when wireless device performs operation on cell2 | |
|---|---|---|---|
| | | Duration of each interruption (Dr) in ms | Interruption probability (Pr) of signals (%) |
| 1 | 1 ms | 5 | 0.5 |
| 2 | 7-OS | 4.5 | 0.4 |
| 3 | 4-OS | 4 | 0.35 |
| 4 | 2-OS | 4 | 0.35 |

The wireless device 16, after obtaining the value of the interruption threshold (Dr and/or Pr) as a function of at least TTI1, ensures that the wireless device 16 while performing the operation on cell2 does not interrupt the signals operating between the wireless device 16 and cell1 by more than the determined value of the interruption threshold, either by the design of the wireless device 16 or according to algorithms which monitor or count interruptions or missed ACK/NACK. This requires the wireless device 16 to adjust or adapt its RF circuitry (e.g. RF filter, PA, etc.) used for reconfiguring the BW of cell2. The wireless device 16 has to ensure that the wireless device 16 receiver and/or transmitter used for operating signals in cell1 are not turned off for more than the time required to meet the determined value of Dr and/or Pr. This is further elaborated with examples below.

In order to meet the requirements in terms of the obtained values of Pr and Dr, the wireless device 16 may have to transmit certain minimum number (N) of UL feedback signals to be transmitted by the wireless device 16 in cell1 in response to receiving data from cell1 during T1. An example of UL feedback signal is ACK or NACK transmission. The determination of N by the wireless device 16 may be a consequence of interruption caused by the operation on cell2 rather than the wireless device 16 explicitly performing a calculation to determine N. For example, the wireless device 16 may obtain the minimum number (N) of UL feedback signals that the wireless device 16 is required to transmit in response to at least continuous transmission of downlink data (e.g., PDSCH, sPDSCH, NPDSCH, etc.) in DL time resources to the wireless device 16 by the network node 14 on cell1 during a time T1.

The minimum number, N, is associated with the TTI used by the wireless device 16 for operating signals in cell1. The length of TTI in cell1 affects the number of DL time resources in which the network node 14 can schedule the wireless device 16 in the DL of cell1 (i.e., send DL data in cell1) during T1. The TTI used in cell1 also affects the number of UL time resources in which the wireless device 16 sends the UL feedback signals in response to DL data in cell1 to the network node 14. Therefore, the value of N increases with shorter TTI. Larger value of N means that the network will have more opportunities for scheduling the wireless device 16 in cell1 when the wireless device 16 performs operation on cell2.

The continuous transmission of DL data herein means that the network node 14 transmits data in all the DL time resources (e.g., DL subframes) in cell1 to the wireless device 16 during the operation on cell2, i.e., over T1. The minimum number, N, may be applicable under or associated with additional conditions or constraints which may include that during at least part of T1 when the wireless device 16 is NOT configured with a measurement gap, the wireless device 16 is NOT configured with any discontinuous reception (DRX) cycle, the wireless device 16 is not operating in DRX mode, the wireless device 16 is configured to receive DL data from the network node 14 with a pre-defined number of code words in one subframe (e.g., 1 code word per subframe) and no multi-broadcast single frequency network (MBSFN) subframe is configured in the serving cell (or PCell).

Examples of subframes which can be configured as MBSFN subframes are subframes #1, 2, 3, 6, 7 and 8 for FDD and subframes #3, 4, 7, 8 and 9 for TDD. The MBSFN subframe can contain only the physical multicast channel (PMCH) and not PDSCH (or sPDSCH). The parameter N may further depend on the TDD configurations (also known as TDD UL/DL subframe configurations) used in cell1. For example, for TDD UL/DL configuration #0 and TDD UL/DL configuration #1, the values of N can be 18 and 35 respectively.

In order to determine the value of Tr the wireless device 16 may first determine the value of TTI configured for operating signals between the wireless device 16 and cell1. For example the wireless device 16 may determine whether it is configured with TTI1 of 1 ms or of 2-OS for operating signals in cell1.

In one example, the DL and UL of cell1 may use the same TTI in the DL and UL of cell1, while in another example different TTIs are used in the DL and UL of cell1. Therefore the wireless device 16 may further obtain the TTI of the DL for cell1 as well as the TTI of the UL for cell1.

The wireless device 16 may determine the TTI configured for operating signals in cell1 based on one or more of the following mechanisms:

configuration received from the network node 14, e.g., PCell. For example the wireless device 16 may determine the TTI used in cell1 by receiving control signals in DL or by receiving the RRC message.

pre-defined rule. Examples of rules are:
  pre-defined information related to the TTI and carrier frequency, e.g., a relation between the TTI and frequency band of the carrier frequency used in cell1, e.g., F1; apply the same TTI as used in a reference cell. Examples of a reference cell is the PCell or PSCell;
  Based on TTI used in the opposite direction of cell1, e.g.:
    Assume the same TTI in UL and DL cell1;
    Assume UL cell1 uses the TTI which is not shorter than the TTI of the DL cell1;

autonomous determination, e.g., blind detection by the wireless device 16 by attempting to decode DL channel of different pre-defined TTIs.

Step-5

In this step, which is optional for the wireless device 16, the wireless device 16 uses the results of the operation on cell2 for performing one or more operational tasks. Examples of the operational tasks include:

Reporting the results of the operation (e.g., measurements) to another node (e.g., a network node 14 or another wireless device 16);

Using the results for one or more operations e.g. for positioning, power control, link adaptation, cell change (e.g., handover);

Performing the measurement while meeting a pre-defined requirement (e.g., measurement time (T1), minimum number of UL feedback signals during T1, number of correctly received messages, etc.);

Storing the results and using them at a later time;
Cell change.

Figure 16:
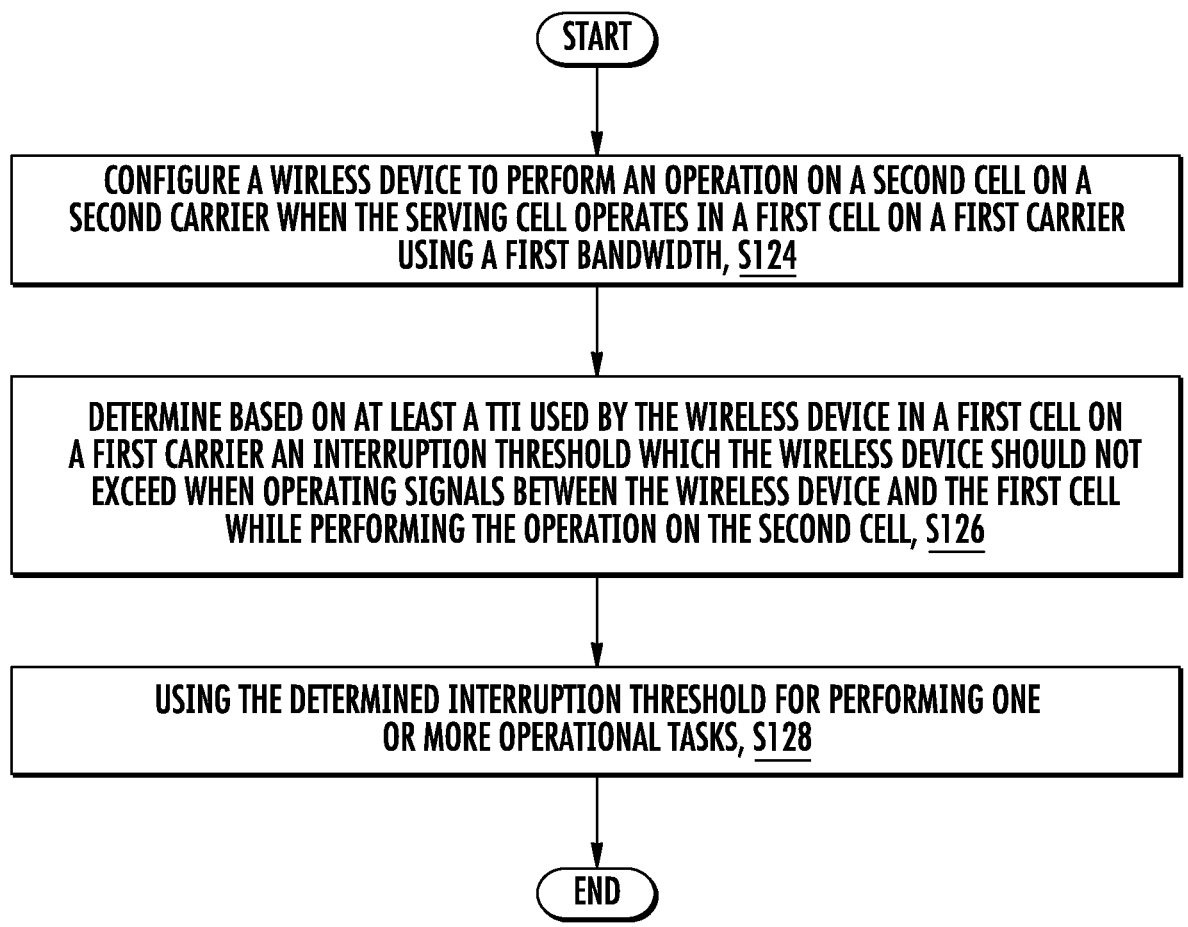
FIG. 16 is a flowchart of an exemplary process in a wireless device node configured according to principles set forth herein.

Methods in a Network Node:

With reference to the flowchart of FIG. 16, in some embodiments, a method in a network node 14 includes the steps of:

Step-1: Configuring a wireless device 16 to perform an operation on a second cell (cell2) on a second carrier frequency (F2) when the serving cell operates in a first cell (cell1) on a first carrier frequency (F1) using a bandwidth of BW1 (block S124);

Step-2: Determining based on at least a TTI used by the wireless device 16 in a first cell (cell1) on a first carrier frequency (F1), an interruption threshold, which the wireless device 16 should not exceed when operating signals (S) between the wireless device 16 and cell1 while performing the operation on cell2 (block S126); and Step-3: Using the determined interruption threshold for performing one or more operational tasks or procedures, e.g., adapting scheduling of signals, transmitting the results to another node, cell change, etc. (block S128). Details of these steps are provided as follows:

Step-1

In this step, the network node 14 transmits a request to the wireless device 16 to perform at least one operation on a second cell (cell2). The network node 14 may first determine a need for the wireless device 16 to perform at least one operation on cell2. This can be based on the need to perform one or more tasks, e.g., cell change, power control, load balancing, SON, positioning, scheduling of signals, CSI results etc.

The network node 14 may send the request to the wireless device 16 based on any of the same mechanism as described in step-1 in the wireless device 16 embodiment.

Step-2

In this step, the network node 14 determines, based on at least a TTI used by the wireless device 16 in a first cell (cell1) on a first carrier frequency (F1), an interruption threshold (Tr), which the wireless device 16 should not exceed when operating signals (S) between the wireless device 16 and cell1 while performing the operation on cell2.

The maximum interruption threshold (Tr) allowed by the wireless device 16 on S depends on at least a TTI (TTI1) used by the wireless device 16 for operating S between the wireless device 16 and cell1. The network node 14 determines the value of Tr based on a relation between Tr and at least TTI1. The network node 14 uses any one or more of the principles (tables, expressions, etc.) described in Step-4 in the wireless device 16 embodiment, for determining the value of Tr as function of TTI1 e.g. Dr, Pr, etc.

In order to determine the value of Tr, the network node 14 may first determine the value of TTI1 configured for operating signals between the wireless device 16 and cell1. For example the network node 14 determines whether it is configured with TTI1 of 1 ms or of 2-OS for operating signals in cell1.

The network node 14 may determine the TTI (i.e. TTI1) configured for operating signals in cell1 based on one or more of the mechanisms described in step-4 in the wireless device 16 embodiment.

Step-3

In this step the network node 14 uses the results of the determined values Pr (e.g. Dr and/or Pr) for operating signals between the wireless device 16 and cell1 for performing one or more operational tasks. Examples of the operational tasks:

Adapting or enhancing scheduling of data to the wireless device 16 in UL and/or DL of the wireless device's serving cell;

Adapting the measurement configuration and transmitting the adapted measurement configuration to the wireless device 16;

Reconfiguring cell parameters e.g. transmission power, antenna transmission mode etc.

Changing TTI used in cell1;

Adapting the parameter Tr (e.g. Dr and/or Tr) by modifying the TTI used in cell1.

The following are some of the advantages obtained using some embodiments described herein.

The wireless device 16 interruption behavior with respect to serving cell performance when the wireless device 16 performs an operation on another cell is well defined using shortened TTI patterns;

The scheduling performance of data to the wireless device 16 in the serving cell is enhanced. This is because the interruption is reduced for shorter TTI used in the serving cell and because interruption can be defined with finer granularity when shorter TTI patterns are in use.

Thus, some embodiments include a method in a wireless device 16 for a wireless communication system supporting at least one transmission time interval (TTI). The method includes communicating with a network node 14 in a first cell on a first carrier. The method further includes determining an operation to be performed by the wireless device 16 in a second cell on a second carrier. The method also includes performing the determined operation in the second cell while interrupting the communication with the network node 14 in the first cell on the first carrier according to a value of an interruption parameter that does not exceed an interruption threshold that depends on a duration of a TTI on the first carrier.

According to this aspect, in some embodiments, the interruption parameter is any one or more of: a time period over which the interruption occurs, a packet loss rate and a number of uplink feedback signals in response to receiving downlink data in the first cell. In some embodiments, the packet loss rate is expressed as a probability of missed acknowledgement/non-acknowledgement (ACK/NACK) signals in the uplink by the wireless device 16 in response to receiving downlink data in the first cell. In some embodiments, the operation requires the wireless device 16 to reconfigure a bandwidth of at least one of the first cell and the second cell. In some embodiments, the operation includes at least one of: a reconfiguration of at least one of the first cell and the second cell, measurements on a cell which is deactivated, a carrier frequency change, setting up a new cell and a release of a cell. In some embodiments, the duration of the TTI on the first carrier of the first cell is one of 7 symbols, 4 symbols, 2 symbols and a mini-slot. In some embodiments, when the first carrier and the second carrier belong to different frequency bands, the interruption threshold is a duration that is substantially 0.5 milliseconds, ms, for 7 symbol duration, substantially 0.4 ms for 4 symbol duration and substantially 0.3 ms for 2 symbol duration. In some embodiments, when the first carrier and the second carrier belong to a same frequency band, the interruption threshold is a duration that is substantially 4.5 milliseconds, ms, for 7 symbol duration, substantially 4 ms for 4 symbol duration and substantially 4 ms for 2 symbol duration. In some embodiments, when the first carrier and the second carrier belong to different frequency bands, the interruption threshold is based on a probability that is substantially 0.25 percent for 7 symbol duration, substantially 0.20 percent for 4 symbol duration and substantially 0.18 percent for 2 symbol duration. In some embodiments, when the first carrier and the second carrier belong to a same frequency band, the interruption threshold is based on a probability that is substantially 0.4 percent for 7 symbol duration, substantially 0.35 percent for 4 symbol duration and substantially 0.35 percent for 2 symbol duration. In some embodiments, the interruption threshold depends on a frequency separation between the first carrier and the second carrier. In some embodiments, a magnitude of the interruption threshold is inversely proportional to a magnitude of the frequency separation. In some embodiments, the interruption threshold depends on whether the first carrier is in a licensed band and the second carrier is in an unlicensed band. In some embodiments, the wireless device 16 determines a duration of a TTI on a carrier of the first cell via one of information received from the network node 14, a predefined rule and autonomous determination.

According to another aspect, in some embodiments, a wireless device 16 for a wireless communication system supporting at least one TTI is provided. The wireless device 16 includes processing circuitry 42 configured to communicate with a network node 14 in a first cell on a first carrier. The processing circuitry 42 is further configured to determine an operation to be performed by the wireless device 16 in a second cell on a second carrier. The processing circuitry 42 is further configured to perform the determined operation in the second cell. The processing circuitry 42 is further configured to interrupt the communicating with the network node 14 in the first cell on the first carrier according to a value of an interruption parameter that does not exceed an interruption threshold that depends on a duration of a TTI on the first carrier.

According this aspect, in some embodiments, the interruption parameter is any one or more of: a time period over which the interruption occurs, a packet loss rate and a number of uplink feedback signals in response to receiving downlink data in the first cell. In some embodiments, the packet loss rate is expressed as a probability of missed ACK/NACK signals in the uplink by the wireless device 16 in response to receiving downlink data in the first cell. In some embodiments, the operation requires the wireless device 16 to reconfigure a bandwidth of at least one of the first cell and the second cell. In some embodiments, the operation includes at least one of: a reconfiguration of at least one of the first cell and the second cell, measurements on a cell which is deactivated, a carrier frequency change, setting up a new cell and a release of a cell. In some embodiments, the duration of the TTI on the first carrier of the first cell is one of 7 symbols, 4 symbols, 2 symbols and a mini-slot. In some embodiments, when the first carrier and the second carrier belong to different frequency bands, the interruption threshold is a duration that is substantially 0.5 milliseconds, ms, for 7 symbol duration, substantially 0.4 ms for 4 symbol duration and substantially 0.3 ms for 2 symbol duration. In some embodiments, when the first carrier and the second carrier belong to a same frequency band, the interruption threshold is a duration that is substantially 4.5 milliseconds, ms, for 7 symbol duration, substantially 4 ms for 4 symbol duration and substantially 4 ms for 2 symbol duration. In some embodiments, the interruption threshold depends on a frequency separation between the first carrier and the second carrier. In some embodiments, a magnitude of the interruption threshold is inversely proportional to a magnitude of the frequency separation. In some embodiments, the interruption threshold depends on whether the first carrier is in a licensed band and the second carrier is in an unlicensed band. In some embodiments, the wireless device 16 determines a duration of a TTI on a carrier of the first cell via one of information received from a network node 14, a predefined rule and autonomous determination.

According to yet another aspect, a wireless device 16 for a wireless communication system supporting at least one TTIs is provided. The wireless device 16 includes a transceiver module 49 configured to communicate with a network node 14 in a first cell on a first carrier. The wireless device 16 includes an operation determination module 55 configured to determine an operation to be performed by the wireless device 16 in a second cell on a second carrier. The wireless device 16 further includes a processing module 59 configured to perform the determined operation in the second cell. The wireless device 16 also includes an interrupt module 57 configured to interrupt the communicating with the network node 14 in the first cell on the first carrier according to an interruption parameter that does not exceed an interruption threshold that depends on a duration of a TTI on the first carrier.

According to one aspect, a method in a network node 14 for a wireless communication system supporting at least one TTI is provided. The method includes communicating with a wireless device 16 in a first cell on a first carrier. The method also includes configuring the wireless device 16 to perform an operation in a second cell on a second carrier. The method also includes determining a value of an interruption parameter according to which communication with the wireless device 16 in the first cell on the first carrier is to be interrupted, the value of the interruption parameter not exceeding an interruption threshold that is based on a duration of a TTI on the first carrier. The method further includes interrupting communication with the wireless device 16 in the first cell on the first carrier according to the value of the interruption parameter while the wireless device 16 performs the operation.

According to this aspect, in some embodiments, the interruption parameter is any one or more of: a time period over which the interruption occurs, a packet loss rate and a number of uplink feedback signals transmitted by the wireless device 16 in response to receiving downlink data in the first cell. In some embodiments, the packet loss rate is expressed as a probability of missed ACK/NACK signal in the uplink by the wireless device 16 in response to receiving downlink data in the first cell. In some embodiments, the operation requires the wireless device 16 to reconfigure a bandwidth of at least one of the first cell and the second cell. In some embodiments, the operation includes at least one of: a reconfiguration of at least one of the first cell and the second cell, measurements on a cell which is deactivated, a carrier frequency change, setting up a new cell and a release of a cell. In some embodiments, the duration of the TTI on the first carrier of the first cell is one of 7 symbols, 4 symbols and 2 symbols. In some embodiments, the threshold interruption depends on a frequency separation between the first carrier and the second carrier. In some embodiments, a magnitude of the threshold interruption is inversely proportional to a magnitude of the frequency separation. In some embodiments, the threshold interruption depends on whether the first carrier is in a licensed band and the second carrier is in an unlicensed band. In some embodiments, the wireless device 16 determines a duration of a TTI on a carrier of the first cell via one of information received from the network node 14, a predefined rule and autonomous determination. In some embodiments, the method further includes using results of the interruption for performing at least one of schedule adaptation, configuration change, TTI change, measurements, carrier frequency change and bandwidth change.

According to yet another aspect, a network node 14 for a wireless communication system supporting at least one TTI is provided. The network node 14 includes a transceiver configured to communicate with a wireless device 16 in a first cell on a first carrier. The network node 14 also includes processing circuitry (22) configured to configure the wireless device 16 to perform an operation in a second cell on a second carrier. The processing circuitry (22) is further configured to determine a value of an interruption parameter according to which communication with the wireless device 16 in the first cell on the first carrier is to be interrupted, the value of the interruption parameter not exceeding an interruption threshold that is based on a duration of a TTI on the first carrier, and interrupt communication with the wireless device 16 in the first cell on the first carrier according to the value of the interruption parameter while the wireless device 16 performs the operation.

According to this aspect, in some embodiments, the operation includes at least one of schedule adaptation, configuration change, TTI change, carrier frequency change and bandwidth change. In some embodiments, the duration of the TTI on the first carrier of the first cell is one of 7 symbols, 4 symbols and 2 symbols. In some embodiments, the interruption threshold depends on a frequency separation between the first carrier and the second carrier. In some embodiments, a magnitude of the interruption threshold interruption is inversely proportional to a magnitude of the frequency separation. In some embodiments, the interruption threshold depends on whether the first carrier is in a licensed band and the second carrier is in an unlicensed band. In some embodiments, the wireless device 16 determines a duration of a TTI on a carrier of the first cell via one of information received from the network node 14, a predefined rule and autonomous determination. In some embodiments, the processing circuitry is further configured to use results of the interruption for performing at least one of schedule adaptation, configuration change, TTI change, measurements, carrier frequency change and bandwidth change.

According to another aspect, a network node 14 for a wireless communication system supporting at least one TTI is provided. The network node 14 includes a transceiver module 29 configured to communicate with a wireless device 16 in a first cell on a first carrier. The network node 14 also includes an operational task module 33 configured to configure the wireless device 16 to perform an operation in a second cell on a second carrier. The network node 14 also includes an interruption determination module 19 configured to determine a value of an interruption parameter according to which communication with the wireless device 16 in the first cell on the first carrier is to be interrupted, the value of the interruption parameter not exceeding an interruption threshold that is based on a duration of a TTI on the first carrier. The network node 14 further includes an interrupt module 35 configured to interrupt communication with the wireless device 16 in the first cell on the first carrier according to the value of the interruption parameter while the wireless device 16 performs the operation.

Some embodiments include the following:

Embodiment 1

A method in a wireless device for supporting operation when a transmission time interval, TTI, changes over time, the method comprising:

- obtaining a request to perform an operation in a second cell at a second carrier frequency when a serving cell operates in a first cell at a first carrier frequency using a first bandwidth;
- configuring the wireless device to operate on a second bandwidth which corresponds to a bandwidth of the second cell;
- performing the requested operation in the second cell; and
- interrupting, while performing the operation in the second cell, signals between the wireless device and the first cell.

Embodiment 2

The method of Embodiment 1, wherein the wireless device is not allowed to cause interruption of signals by more than a maximum allowed interruption of signals.

Embodiment 3

The method of Embodiment 2, wherein the maximum allowed interruption of signals depends at least on a duration of a TTI.

Embodiment 4

The method of Embodiment 3, wherein the maximum allowed interruption of signals depends on a relationship between the first and second carrier frequencies.

Embodiment 5

The method of Embodiment 1, further comprising using results of the operation in the second cell for performing one or more operational tasks.

Embodiment 6

A wireless device for supporting operation when a transmission time interval, TTI, changes over time, the wireless device comprising:

- a receiver configured to receive a request to perform an operation in a second cell at a second carrier frequency when the serving cell operates in a first cell at a first carrier frequency using a first bandwidth;
- processing circuitry including a memory and a processor;
  - the memory configured to store the request;
  - the processor configured to:
    - cause the receiver to operate on a second bandwidth which corresponds to a bandwidth of the second cell;
    - perform the requested operation in the second cell; and
    - interrupt, while performing the operation in the second cell, signals between the wireless device and the first cell.

Embodiment 7

The wireless device of Embodiment 6, wherein the wireless device is not allowed to cause interruption of signals by more than a maximum allowed interruption of signals.

Embodiment 8

The wireless device of Embodiment 7, wherein the maximum allowed interruption of signals depends at least on a duration of a TTI.

Embodiment 9

The wireless device of Embodiment 8, wherein the maximum allowed interruption of signals depends on a relationship between the first and second carrier frequencies.

Embodiment 10

The wireless device of Embodiment 6, further comprising using results of the operation in the second cell for performing one or more operational tasks.

Embodiment 11

A method in a network node for supporting operation when a transmission time interval, TTI, changes over time, the method comprising:
configuring a wireless device to perform an operation in a second cell at a second carrier frequency when the serving cell operates in a first cell at a first carrier frequency using a first bandwidth;
determining a maximum interruption level which the wireless device should not exceed when operating signals between the wireless device and the first cell while performing the operation in the second cell; and
using the determined interruption level for performing at least one operational task.

Embodiment 12

The method of Embodiment 11, wherein a maximum allowed interruption of signals depends at least on a duration of a TTI.

Embodiment 13

The method of Embodiment 12, wherein the maximum allowed interruption of signals depends on a relationship between the first and second carrier frequencies.

Embodiment 14

The method of Embodiment 11, wherein the at least one operational task includes at least one of adapting scheduling of data to the wireless device, adapting a measurement configuration and transmitting the adapted measurement configuration to the wireless device, reconfiguring cell parameters, changing the TTI used in the first cell.

Embodiment 15

A network node for supporting operation when a transmission time interval, TTI, changes over time, the network node comprising:
a transmitter configured to send a command to a wireless device, the command configuring the wireless device to perform an operation in a second cell at a second carrier frequency when the serving cell operates in a first cell at a first carrier frequency using a first bandwidth;
processing circuitry including a memory and a processor;
the memory configured to store the command;
the processor configured to:
determine a maximum interruption level which the wireless device should not exceed when operating signals between the wireless device and the first cell while performing the operation in the second cell; and
use the determined interruption level for performing at least one operational task.

Embodiment 16

The network node of Embodiment 15, wherein a maximum allowed interruption of signals depends at least on a duration of a TTI.

Embodiment 17

The network node of Embodiment 16, wherein the maximum allowed interruption of signals depends on a relationship between the first and second carrier frequencies.

Embodiment 18

The network node of Embodiment 15, wherein the at least one operational task includes at least one of adapting scheduling of data to the wireless device, adapting a measurement configuration and transmitting the adapted measurement configuration to the wireless device, reconfiguring cell parameters, changing the TTI used in the first cell.

Embodiment 19

A wireless device for supporting operation when a transmission time interval, TTI, changes over time, the wireless device comprising:
a receiver module configured to receive a request to perform an operation in a second cell at a second carrier frequency when the serving cell operates in a first cell at a first carrier frequency using a first bandwidth;
a memory module configured to store the request;
a bandwidth controller module configured to cause the receiver to operate on a second bandwidth which corresponds to a bandwidth of the second cell;
an operation module configured to perform the requested operation in the second cell; and
an interrupt module configured to interrupt, while performing the operation in the second cell, signals between the wireless device and the first cell.

Embodiment 20

A network node for supporting operation when a transmission time interval, TTI, changes over time, the network node comprising:
a transmitter module configured to send a command to a wireless device, the command configuring the wireless device to perform an operation in a second cell at a second carrier frequency when the serving cell operates in a first cell at a first carrier frequency using a first bandwidth;
a memory module configured to store the command;
an interruption determiner module configured to determine a maximum interruption level which the wireless device should not exceed when operating signals between the wireless device and the first cell while performing the operation in the second cell; and an operational task module configured to use the determined interruption level for performing at least one operational task.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a wireless device for a wireless communication system supporting at least one transmission time interval, TTI, the method comprising:
   communicating with a network node in a first cell on a first carrier;
   determining an operation to be performed by the wireless device in a second cell on a second carrier; and
   performing the determined operation in the second cell while interrupting the communication with the network node in the first cell on the first carrier according to a value of an interruption parameter that does not exceed an interruption threshold that depends on a duration of a TTI on the first carrier and further depends on a frequency separation between the first carrier and the second carrier.

2. The method of claim 1, wherein the interruption parameter is at least one of: a time period over which the interruption occurs, a packet loss rate and a number of uplink feedback signals in response to receiving downlink data in the first cell.

3. The method of claim 2, wherein the packet loss rate is expressed as a probability of missed acknowledgement/non-acknowledgement, ACK/NACK, signals in the uplink by the wireless device in response to receiving downlink data in the first cell.

4. The method of claim 1, wherein the operation requires the wireless device to reconfigure a bandwidth of at least one of the first cell and the second cell.

5. The method of claim 1, wherein the operation includes at least one of: a reconfiguration of at least one of the first cell and the second cell, measurements on a cell which is deactivated, a carrier frequency change, setting up a new cell and a release of a cell.

6. The method of claim 1, wherein the interruption threshold depends on whether the first carrier is in a licensed band and the second carrier is in an unlicensed band.

7. A wireless device for a wireless communication system supporting at least one transmission time interval, TTI, the wireless device comprising:
processing circuitry configured to:
communicate with a network node in a first cell on a first carrier;
determine an operation to be performed by the wireless device in a second cell on a second carrier;
perform the determined operation in the second cell; and
interrupt the communicating with the network node in the first cell on the first carrier according to a value of an interruption parameter that does not exceed an interruption threshold that depends on a duration of a TTI on the first carrier and further depends on a frequency separation between the first carrier and the second carrier.

8. A method in a network node for a wireless communication system supporting at least one transmission time interval, TTI, the method comprising:
communicating with a wireless device in a first cell on a first carrier;
configuring the wireless device to perform an operation in a second cell on a second carrier;
determining a value of an interruption parameter according to which communication with the wireless device in the first cell on the first carrier is to be interrupted, the value of the interruption parameter not exceeding an interruption threshold that is based on a duration of a TTI on the first carrier and further depends on a frequency separation between the first carrier and the second carrier; and
interrupting communication with the wireless device in the first cell on the first carrier according to the value of the interruption parameter while the wireless device performs the operation.

9. The method of claim 8, wherein the interruption parameter at least one of: a time period over which the interruption occurs, a packet loss rate and a number of uplink feedback signals transmitted by the wireless device in response to receiving downlink data in the first cell.

10. The method of claim 9, wherein the packet loss rate is expressed as a probability of missed acknowledgement/non-acknowledgement, ACK/NACK, signal in the uplink by the wireless device in response to receiving downlink data in the first cell.

11. The method of claim 8, wherein the operation requires the wireless device to reconfigure a bandwidth of at least one of the first cell and the second cell.

12. The method of claim 8, wherein the operation includes at least one of: a reconfiguration of at least one of the first cell and the second cell, measurements on a cell which is deactivated, a carrier frequency change, setting up a new cell and a release of a cell.

13. The method of claim 8, wherein the threshold interruption depends on whether the first carrier is in a licensed band and the second carrier is in an unlicensed band.

14. A network node for a wireless communication system supporting at least one transmission time interval, TTIs, the network node comprising:
a transceiver configured to communicate with a wireless device in a first cell on a first carrier; and
processing circuitry configured to:
configure the wireless device to perform an operation in a second cell on a second carrier;
determine a value of an interruption parameter according to which communication with the wireless device in the first cell on the first carrier is to be interrupted, the value of the interruption parameter not exceeding an interruption threshold that is based on a duration of a TTI on the first carrier and further depends on a frequency separation between the first carrier and the second carrier; and
interrupt communication with the wireless device in the first cell on the first carrier according to the value of the interruption parameter while the wireless device performs the operation.

* * * * *